(12) United States Patent
Raghavan et al.

(10) Patent No.: US 11,695,462 B2
(45) Date of Patent: Jul. 4, 2023

(54) TECHNIQUES FOR COORDINATED BEAMFORMING IN MILLIMETER WAVE SYSTEMS

(71) Applicant: QUALCOMM incorporated, San Diego, CA (US)

(72) Inventors: Vasanthan Raghavan, West Windsor Township, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 16/748,754

(22) Filed: Jan. 21, 2020

(65) Prior Publication Data
US 2020/0244338 A1    Jul. 30, 2020

Related U.S. Application Data

(60) Provisional application No. 62/798,340, filed on Jan. 29, 2019.

(51) Int. Cl.
*H04B 7/06* (2006.01)
*H04B 7/024* (2017.01)
(Continued)

(52) U.S. Cl.
CPC .......... *H04B 7/0695* (2013.01); *H04B 7/024* (2013.01); *H04B 7/0408* (2013.01);
(Continued)

(58) Field of Classification Search
CPC .... H04B 7/0695; H04B 7/0617; H04B 7/024; H04B 7/0626; H04B 7/0417;
(Continued)

(56) References Cited

U.S. PATENT DOCUMENTS 5,086,775 A * 2/1992 Parker ............... G01N 29/46
                                                    600/453
6,847,327 B2 * 1/2005 Ylitalo .................. H01Q 21/00
                                                    342/427
(Continued)

FOREIGN PATENT DOCUMENTS

CN    102356561 A  *  2/2012   ........... H04B 7/0417
CN    102356562 A  *  2/2012   ........... H04B 7/0417
(Continued)

OTHER PUBLICATIONS

Antenna Performance co-phasing by IW5EDI Simone—HamRadio, (www.iw5edi.comham-radio2464antenna-performance-cophasing) (Year: 2021).*

(Continued)

*Primary Examiner* — Berhanu Tadese
(74) *Attorney, Agent, or Firm* — Holland & Hart LLP

(57) ABSTRACT

Methods, systems, and devices for wireless communications that support coordinated beamforming in millimeter wave (mmW) systems. A user equipment (UE) may indicate a number of supported antennas for signal reception. A plurality of transmission-reception points (TRxPs) may coordinate a beam training with the supported antennas, in determining a beam estimation for coordinated reception at the UE. The coordinated beam training may be carried over combined beams of the associated TRxPs, and may be based on co-phasing factors within a single antenna panel for each of the TRxPs. Based on the coordinated beam training, the UE may determine a matched filtering beam estimate for reception and receive coordinated beamformed transmissions from the plurality of TRxPs as part of coordinated multipoint (CoMP) transmissions.

27 Claims, 17 Drawing Sheets

(51) Int. Cl.
*H04L 5/00* (2006.01)
*H04B 7/0417* (2017.01)
*H04B 7/0408* (2017.01)

(52) U.S. Cl.
CPC ......... *H04B 7/0417* (2013.01); *H04B 7/0617* (2013.01); *H04B 7/0626* (2013.01); *H04L 5/0051* (2013.01)

(58) Field of Classification Search
CPC ....... H04B 7/0408; H04B 7/06; H04L 5/0051; H04L 5/00; H04L 5/14
See application file for complete search history.

(56) References Cited

U.S. PATENT DOCUMENTS

| | | | | |
|---|---|---|---|---|
| 8,340,233 B2* | 12/2012 | Karagiannidis | ........ | H04B 7/084 375/267 |
| 8,385,452 B2* | 2/2013 | Gorokhov | ........... | H04L 25/0248 375/267 |
| 8,432,821 B2* | 4/2013 | Gorokhov | ............... | H04L 5/006 370/254 |
| 8,478,190 B2* | 7/2013 | Sayana | ................. | H04L 5/0091 455/7 |
| 8,498,647 B2* | 7/2013 | Gorokhov | .............. | H04B 7/024 455/448 |
| 8,509,338 B2* | 8/2013 | Sayana | ............. | H04L 25/03343 375/267 |
| 8,867,380 B2* | 10/2014 | Gorokhov | ............. | H04W 16/28 370/252 |
| 8,867,493 B2* | 10/2014 | Gorokhov | ............. | H04B 7/0634 370/332 |
| 8,948,028 B2* | 2/2015 | Zhang | ................. | H04W 56/005 370/252 |
| 8,983,397 B2* | 3/2015 | Gorokhov | ............. | H04L 5/0057 455/69 |
| 8,995,541 B2* | 3/2015 | Tong | .................... | H04B 7/0478 375/220 |
| 9,124,327 B2* | 9/2015 | Gomadam | ........... | H04B 7/0626 |
| 9,203,489 B2* | 12/2015 | Sayana | ................ | H04B 7/0456 |
| 9,287,959 B2* | 3/2016 | Mazzarese | ........... | H04B 7/0647 |
| 9,401,748 B2* | 7/2016 | Chen | ....................... | H04B 7/043 |
| 9,401,750 B2* | 7/2016 | Sayana | ................ | H04B 7/0478 |
| 9,407,345 B2* | 8/2016 | Kim | ........................ | H04B 7/04 |
| 9,467,871 B2* | 10/2016 | Hwang | ................. | H04W 16/28 |
| 9,537,552 B2* | 1/2017 | Li | ........................ | H04B 7/0639 |
| 9,571,250 B2* | 2/2017 | Chen | ...................... | H04B 7/0632 |
| 9,590,757 B2* | 3/2017 | Levakov | ............ | H04L 5/0073 |
| 9,660,784 B2* | 5/2017 | Lunttila | ............ | H04L 25/03343 |
| 9,667,328 B2* | 5/2017 | Xin | ....................... | H04B 7/0456 |
| 9,667,397 B2* | 5/2017 | Chen | ....................... | H04B 7/084 |
| 9,698,887 B2* | 7/2017 | Geirhofer | ............ | H04B 7/0639 |
| 9,735,844 B2* | 8/2017 | Chen | ....................... | H04B 7/024 |
| 9,813,123 B2* | 11/2017 | Nam | ...................... | H04L 5/0048 |
| 9,825,742 B2* | 11/2017 | Nam | ...................... | H04L 5/0048 |
| 9,866,291 B1* | 1/2018 | Cariou | ................. | H04B 7/0452 |
| 10,117,207 B2 | 10/2018 | Fan | .................... | H04L 25/0204 |
| 10,218,824 B2 | 2/2019 | Cariou | ................ | H04B 7/0695 |
| 10,243,630 B2 | 3/2019 | Cariou | ................ | H04L 69/322 |
| 10,305,537 B2 | 5/2019 | Fan | ........................... | H04L 7/06 |
| 10,397,888 B2 | 8/2019 | Zhang | ........... | H04L 25/0202 |
| 10,412,769 B2 | 9/2019 | Cherian | ........... | H04L 25/0224 |
| 10,477,613 B2 | 11/2019 | Kim | ....................... | H04W 24/10 |
| 10,491,356 B2 | 11/2019 | Gorokhov | ............. | H04W 24/10 |
| 10,616,839 B2* | 4/2020 | Fan | ..................... | H04W 56/001 |
| 10,797,777 B2 | 10/2020 | Su | .......................... | H04W 76/14 |
| 10,804,994 B2 | 10/2020 | Gao | ..................... | H04B 7/0639 |
| 10,820,332 B2 | 10/2020 | Zhou | ...................... | H04L 5/005 |
| 10,820,333 B2 | 10/2020 | Zhou | ...................... | H04L 5/0073 |
| 10,862,546 B2 | 12/2020 | Raghavan | .......... | H04B 17/382 |
| 10,917,523 B2 | 2/2021 | Nam | ...................... | H04L 5/0048 |
| 10,951,279 B2 | 3/2021 | Nam | ...................... | H04B 7/0634 |
| 10,951,291 B2 | 3/2021 | Xi | ......................... | H04B 7/0417 |
| 2010/0027471 A1* | 2/2010 | Palanki | .................. | H04B 7/024 370/328 |
| 2010/0056215 A1* | 3/2010 | Gorokhov | .............. | H04B 7/024 455/561 |
| 2010/0085917 A1* | 4/2010 | Gorokhov | .............. | H04L 5/0073 370/328 |
| 2010/0091892 A1* | 4/2010 | Gorokhov | ............. | H04L 1/0026 375/260 |
| 2010/0104033 A1* | 4/2010 | Gorokhov | ............. | H04L 5/0035 375/260 |
| 2010/0195527 A1* | 8/2010 | Gorokhov | ............. | H04B 7/0417 370/252 |
| 2010/0202308 A1* | 8/2010 | Gorokhov | ............. | H04B 7/0634 370/252 |
| 2010/0315970 A1* | 12/2010 | Ramamurthi | ........ | H04B 7/0619 370/252 |
| 2011/0085460 A1* | 4/2011 | Zhang | .................... | H04B 7/024 370/252 |
| 2011/0188393 A1* | 8/2011 | Mallik | .................. | H04B 7/066 370/252 |
| 2011/0211490 A1* | 9/2011 | Nikula | .................. | H04B 7/086 370/252 |
| 2012/0026940 A1* | 2/2012 | Barbieri | ................ | H04W 24/10 370/328 |
| 2012/0063383 A1* | 3/2012 | Barbieri | .............. | H04W 72/541 370/329 |
| 2012/0250550 A1* | 10/2012 | Gomadam | ........... | H04B 7/0623 370/252 |
| 2012/0287799 A1* | 11/2012 | Chen | .................... | H04B 7/0626 370/252 |
| 2013/0044697 A1* | 2/2013 | Yoo | ........................ | H04L 1/0003 370/328 |
| 2013/0051265 A1* | 2/2013 | Barbieri | ................ | H04B 7/024 370/252 |
| 2013/0083730 A1* | 4/2013 | Gaal | ..................... | H04W 52/40 370/328 |
| 2013/0136016 A1* | 5/2013 | Lee | .................... | H04W 72/0446 370/255 |
| 2013/0176934 A1* | 7/2013 | Malladi | ............... | H04W 56/001 370/315 |
| 2013/0219055 A1* | 8/2013 | Palanki | .................. | H04B 17/24 709/224 |
| 2013/0229935 A1* | 9/2013 | Gorokhov | ............. | H04L 5/006 370/252 |
| 2013/0258886 A1* | 10/2013 | Chen | ....................... | H04B 7/084 370/252 |
| 2014/0094164 A1* | 4/2014 | Hwang | ................. | H04W 16/28 455/423 |
| 2014/0301492 A1* | 10/2014 | Xin | ...................... | H04B 7/0456 375/267 |
| 2015/0049626 A1* | 2/2015 | Chen | ................... | H04B 7/024 370/252 |
| 2015/0103807 A1* | 4/2015 | Montojo | ............ | H04J 11/0053 370/335 |
| 2015/0195071 A1* | 7/2015 | Lunttila | ............ | H04L 25/03904 370/329 |
| 2015/0195075 A1* | 7/2015 | Gorokhov | ............. | H04L 1/0026 370/329 |
| 2015/0280801 A1* | 10/2015 | Xin | ...................... | H04L 5/0048 370/329 |
| 2015/0365155 A1* | 12/2015 | Subramanian | ....... | H04B 7/0697 370/329 |
| 2016/0119097 A1* | 4/2016 | Nam | ...................... | H04L 5/0048 370/329 |
| 2016/0127154 A1* | 5/2016 | Ruiz Delgado | ..... | H04L 25/0234 370/328 |
| 2016/0157218 A1* | 6/2016 | Nam | ................... | H04B 7/0632 370/329 |
| 2016/0173180 A1* | 6/2016 | Cheng | ................. | H04B 7/0417 375/267 |
| 2016/0205676 A1* | 7/2016 | Chen | ..................... | H04L 5/005 370/329 |
| 2016/0270105 A1* | 9/2016 | Zhou | .................. | H04W 72/1263 |
| 2016/0309466 A1* | 10/2016 | Chen | ................. | H04W 36/0069 |
| 2016/0352487 A1* | 12/2016 | Chen | ................... | H04B 7/0639 |
| 2017/0093540 A1* | 3/2017 | Lei | ...................... | H04J 11/0069 |
| 2017/0134080 A1* | 5/2017 | Rahman | ............ | H04L 5/0048 |
| 2017/0134187 A1* | 5/2017 | Chen | ................ | H04L 25/0202 |

(56) References Cited

U.S. PATENT DOCUMENTS

| | | | |
|---|---|---|---|
| 2017/0244462 A1* | 8/2017 | Wei | H04B 7/0626 |
| 2017/0272220 A1* | 9/2017 | Chen | H04B 7/0417 |
| 2017/0279513 A1* | 9/2017 | Geirhofer | H04B 7/0626 |
| 2017/0359849 A1* | 12/2017 | Zhang | H04W 74/04 |
| 2017/0366234 A1* | 12/2017 | Chen | H04B 7/0636 |
| 2018/0006688 A1* | 1/2018 | Cariou | H04L 69/322 |
| 2018/0006705 A1* | 1/2018 | Cariou | H04L 69/28 |
| 2018/0027580 A1* | 1/2018 | Yoo | H04W 72/046 370/230 |
| 2018/0062708 A1* | 3/2018 | Sun | H04B 7/0632 |
| 2018/0062811 A1* | 3/2018 | Akkarakaran | H04L 5/0007 |
| 2018/0077284 A1* | 3/2018 | Nam | H04L 65/80 |
| 2018/0098308 A1* | 4/2018 | Sun | H04L 5/0023 |
| 2018/0167116 A1* | 6/2018 | Rahman | H04B 7/0626 |
| 2018/0167903 A1* | 6/2018 | Fan | H04L 25/0224 |
| 2018/0205419 A1* | 7/2018 | Zhou | H04B 7/0697 |
| 2018/0205429 A1* | 7/2018 | Venkatachalam Jayaraman | H04B 7/024 |
| 2018/0205434 A1* | 7/2018 | Cherian | H04B 7/0452 |
| 2018/0206202 A1* | 7/2018 | Merlin | H04W 56/001 |
| 2018/0206274 A1* | 7/2018 | Cherian | H04B 7/0417 |
| 2018/0249401 A1* | 8/2018 | Zhou | H04B 7/024 |
| 2018/0262239 A1* | 9/2018 | Cariou | H04B 7/0491 |
| 2018/0262259 A1* | 9/2018 | Sano | H04W 16/28 |
| 2018/0262936 A1* | 9/2018 | Zhou | H04J 11/0053 |
| 2018/0263043 A1* | 9/2018 | Zhou | H04B 7/0413 |
| 2018/0263044 A1* | 9/2018 | Zhou | H04B 7/024 |
| 2018/0263045 A1* | 9/2018 | Zhou | H04B 7/0413 |
| 2018/0278315 A1* | 9/2018 | Wu | H04B 7/0632 |
| 2018/0317186 A1* | 11/2018 | Fan | H04W 56/0005 |
| 2018/0343605 A1* | 11/2018 | Wu | H04W 8/005 |
| 2018/0375545 A1* | 12/2018 | Fan | H04L 7/06 |
| 2019/0028168 A1* | 1/2019 | Vermani | H04B 7/024 |
| 2019/0036583 A1* | 1/2019 | Cherian | H04L 5/0051 |
| 2019/0045366 A1* | 2/2019 | Vermani | H04B 7/0626 |
| 2019/0097693 A1* | 3/2019 | Park | H04L 5/0023 |
| 2019/0109625 A1* | 4/2019 | Subramanian | H04B 7/0628 |
| 2019/0116599 A1* | 4/2019 | Xue | H04L 5/0035 |
| 2019/0159220 A1* | 5/2019 | Elsherif | H04W 72/12 |
| 2019/0239092 A1* | 8/2019 | Zhou | H04W 24/10 |
| 2019/0253106 A1* | 8/2019 | Raghavan | H04B 17/382 |
| 2019/0253112 A1* | 8/2019 | Raghavan | H04B 7/063 |
| 2019/0254007 A1* | 8/2019 | Gupta | H04W 72/0453 |
| 2019/0261369 A1* | 8/2019 | Verma | H04B 7/0619 |
| 2019/0341976 A1* | 11/2019 | Nam | H04B 7/0478 |
| 2019/0349151 A1* | 11/2019 | Zhang | H04L 5/0032 |
| 2019/0356434 A1* | 11/2019 | Stauffer | H04L 5/0048 |
| 2020/0028560 A1* | 1/2020 | Gao | H04W 72/046 |
| 2020/0045576 A1* | 2/2020 | Huang | H04L 41/0893 |
| 2020/0045585 A1* | 2/2020 | Huang | H04W 28/10 |
| 2020/0145079 A1* | 5/2020 | Marinier | H04L 5/0051 |
| 2020/0244338 A1* | 7/2020 | Raghavan | H04L 5/0057 |
| 2020/0245372 A1* | 7/2020 | Lei | H04L 27/2602 |
| 2020/0266875 A1* | 8/2020 | Zhou | H04B 7/0628 |
| 2020/0267536 A1* | 8/2020 | Zhou | H04B 7/0404 |
| 2020/0287604 A1* | 9/2020 | Gao | H04B 7/0617 |
| 2020/0313738 A1* | 10/2020 | Iyer | H04B 7/0667 |
| 2020/0313947 A1* | 10/2020 | Noh | H04L 5/0082 |
| 2020/0336591 A9* | 10/2020 | Nam | H04M 3/5191 |
| 2020/0396766 A1* | 12/2020 | Xue | H04L 5/0092 |
| 2020/0413278 A1* | 12/2020 | Zhou | H04B 7/0413 |
| 2021/0007113 A1* | 1/2021 | Zhou | H04B 7/0413 |
| 2021/0021327 A1* | 1/2021 | Jorguseski | H04W 72/12 |
| 2021/0037423 A1* | 2/2021 | Huang | H04L 12/4625 |
| 2021/0045134 A1* | 2/2021 | Zhou | H04B 7/0413 |
| 2021/0045135 A1* | 2/2021 | Zhou | H04B 7/0617 |
| 2021/0127291 A1* | 4/2021 | Chen | H04W 28/06 |
| 2021/0136598 A1* | 5/2021 | Raghavan | H04B 7/0626 |
| 2021/0203393 A1* | 7/2021 | Chung | H04B 7/0417 |

FOREIGN PATENT DOCUMENTS

| | | | |
|---|---|---|---|
| CN | 102577152 A * | 7/2012 | H04B 7/024 |
| CN | 102939775 A * | 2/2013 | H04B 7/063 |
| CN | 102356562 B * | 7/2015 | H04B 7/0417 |
| CN | 102577152 B * | 7/2015 | H04B 7/024 |
| EP | 3364552 A1 * | 8/2018 | H04B 7/024 |
| EP | 3364552 A4 * | 2/2019 | H04B 7/024 |
| EP | 3565358 A1 * | 11/2019 | H04L 5/0032 |
| EP | 3571777 A1 * | 11/2019 | H04B 7/024 |
| EP | 3593458 A1 * | 1/2020 | H04B 7/024 |
| EP | 3641150 A1 * | 4/2020 | H04B 7/0404 |
| WO | WO-9207514 A1 * | 5/1992 | G01H 9/008 |
| WO | WO-2010040098 A2 * | 4/2010 | H04L 5/0023 |
| WO | WO-2010042234 A1 * | 4/2010 | H04B 7/024 |
| WO | WO-2010048502 A1 * | 4/2010 | H04B 7/024 |
| WO | WO-2010088662 A2 * | 8/2010 | H04B 7/0417 |
| WO | WO-2010088664 A2 * | 8/2010 | H04B 7/0417 |
| WO | WO-2010088664 A3 * | 9/2010 | H04B 7/0417 |
| WO | WO-2010088662 A3 * | 10/2010 | H04B 7/0417 |
| WO | WO-2010040098 A3 * | 11/2010 | H04L 5/0023 |
| WO | WO-2011017468 A2 * | 2/2011 | H04L 5/0032 |
| WO | WO-2011047077 A2 * | 4/2011 | H04B 7/024 |
| WO | WO-2011047077 A3 * | 6/2011 | H04B 7/024 |
| WO | WO-2017113093 A1 | 7/2017 | |
| WO | WO-2018063824 A1 | 4/2018 | |
| WO | WO-2018064327 A1 | 4/2018 | |
| WO | WO-2018137586 A1 | 8/2018 | |
| WO | WO-2018169801 A1 * | 9/2018 | H04B 7/024 |
| WO | WO-2018233568 A1 * | 12/2018 | H04B 7/0404 |
| WO | WO-2020062040 A1 * | 4/2020 | |
| WO | WO-2020063427 A1 * | 4/2020 | |
| WO | WO-2020159770 A1 * | 8/2020 | H04B 7/024 |

OTHER PUBLICATIONS

International Search Report and Written Opinion—PCT/US2020/014599—ISA/EPO—dated May 8, 2020.

* cited by examiner

TECHNIQUES FOR COORDINATED BEAMFORMING IN MILLIMETER WAVE SYSTEMS

CROSS REFERENCE

The present for Patent claims the benefit of U.S. Provisional Patent Application No. 62/798,340 by RAGHAVAN, et al., entitled "TECHNIQUES FOR COORDINATED BEAMFORMING IN MILLIMETER WAVE SYSTEMS," filed Jan. 29, 2019, assigned to the assignee hereof, and expressly incorporated herein.

BACKGROUND

The following relates generally to wireless communications, and more specifically to techniques for coordinated beamforming in millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may operate in mmW frequency ranges, e.g., 26 GHz, 28 GHz, 39 GHz, 57-71 GHz, etc. Wireless communications at these frequencies may be associated with increased signal attenuation (e.g., path loss, penetration loss, blockage loss), which may be influenced by various factors. Signal processing techniques, such as beamforming, may be used by a transmitting device (e.g., a TRxP) to coherently combine energy and overcome the path losses at these frequencies. Moreover, a receiving device (e.g., a UE) may use beamforming techniques to configure antenna elements so that transmissions are received in a directional manner.

Techniques to improve beamforming may be desired for achieving higher reliability and throughput in wireless communication systems.

SUMMARY

The described techniques relate to improved methods, systems, devices, and apparatuses that support techniques for coordinated beamforming in millimeter wave (mmW) systems. Generally, the described techniques provide capability for coordinated beam training between multiple transmitting devices (e.g., transmission and receive points (TRxPs)) and a receiving device (e.g., user equipment (UE)), to support coordinated multipoint (CoMP) transmission. Aspects of the described techniques may include beamforming vector approximation at the multiple TRxPs based on feedback received from the UE. The feedback may include one or more beam indices for a respective TRxP, signal strength measurements for beam pairs in an uncoordinated beam training, and co-phasing factors within a single antenna panel of the respective TRxP. The TRxPs may receive feedback associated with each supported antenna panel, as an antenna array at a TRxP may include multiple antenna panels. Each of the TRxPs may then process the co-phasing factor feedback and determine a beam weight generation at each antenna panel to support co-phasing multiple clusters in a channel.

Accordingly, the UE may communicate an indication for a number of supported antennas for signal reception. The multiple TRxPs may coordinate over supported backhaul links and initiate a coordinated (e.g., joint) beam training using the generated beam weights of the approximations. Based on the coordinated beam training, the UE may estimate an effective channel on the supported antennas and determine a combined beam estimate for reception and subsequent processing. The UE may then receive the CoMP transmission from the multiple TRxPs over the determined receive beam. In some examples, the CoMP transmission according to the coordinated beam training may promote an enhanced channel approximation, leading to signal performance (e.g., rate, signal to noise ratio (SNR)) improvement and enhanced signal robustness via beam diversity.

A method of wireless communication at a UE including is described. The method may include transmitting, to a set of transmission-reception points, an indication of a number of supported antennas at the UE for signal reception, transmitting a request for a coordinated beam training by the set of transmission-reception points over a set of resources, the set of resources based on the number of supported antennas at the UE, determining, based on the coordinated beam training, a set of beam weights for coordinated reception at the supported antennas of the UE, and receiving, based on the determining, a coordinated beamformed transmission from the set of transmission-reception points.

An apparatus for wireless communication at a UE including is described. The apparatus may include a processor, memory in electronic communication with the processor, and instructions stored in the memory. The instructions may be executable by the processor to cause the apparatus to transmit, to a set of transmission-reception points, an indication of a number of supported antennas at the UE for signal reception, transmit a request for a coordinated beam training by the set of transmission-reception points over a set of resources, the set of resources based on the number of supported antennas at the UE, determine, based on the coordinated beam training, a set of beam weights for coordinated reception at the supported antennas of the UE, and receive, based on the determining, a coordinated beamformed transmission from the set of transmission-reception points.

Another apparatus for wireless communication at a UE including is described. The apparatus may include means for transmitting, to a set of transmission-reception points, an indication of a number of supported antennas at the UE for signal reception, transmitting a request for a coordinated beam training by the set of transmission-reception points over a set of resources, the set of resources based on the number of supported antennas at the UE, determining, based on the coordinated beam training, a set of beam weights for coordinated reception at the supported antennas of the UE, and receiving, based on the determining, a coordinated beamformed transmission from the set of transmission-reception points.

A non-transitory computer-readable medium storing code for wireless communication at a UE including is described. The code may include instructions executable by a processor to transmit, to a set of transmission-reception points, an indication of a number of supported antennas at the UE for signal reception, transmit a request for a coordinated beam training by the set of transmission-reception points over a set of resources, the set of resources based on the number of supported antennas at the UE, determine, based on the coordinated beam training, a set of beam weights for coordinated reception at the supported antennas of the UE, and receive, based on the determining, a coordinated beamformed transmission from the set of transmission-reception points.

Some examples of the method, apparatuses, and non-transitory computer-readable medium described herein may further include operations, features, means, or instructions for determining, for a transmission-reception point of the set of transmission-reception points, a set of co-phasing factors within an antenna panel.

In some examples of the method, apparatuses, and non-transitory computer-readable medium described herein, the set of co-phasing factors within the antenna panel may be associated with distinct clusters of a channel, the channel supporting communication between the transmission-reception point and the UE.

Some examples of the method, apparatuses, and non-transitory computer-readable medium described herein may further include operations, features, means, or instructions for receiving beam swept synchronization signals from the transmission-reception point, selecting, based on the receiving, a first set of beams for non-coordinated transmissions by the transmission-reception point and a second set of beams for reception at the UE, and determining a signal strength for a set of beam pairs, each beam pair of the set of beam pairs including a beam of the first set of beams and a beam of the second set of beams.

Some examples of the method, apparatuses, and non-transitory computer-readable medium described herein may further include operations, features, means, or instructions for correlating symbol estimates for each beam pair of the set of beam pairs, and where determining the set of co-phasing factors within the antenna panel may be based on the correlating.

Some examples of the method, apparatuses, and non-transitory computer-readable medium described herein may further include operations, features, means, or instructions for transmitting, to the transmission-reception point, an indication of the first set of beams, the signal strength for the set of beam pairs, and the set of co-phasing factors within the antenna panel.

Some examples of the method, apparatuses, and non-transitory computer-readable medium described herein may further include operations, features, means, or instructions for receiving a reference signal transmission from each transmission-reception point of the set of transmission-reception points as part of the coordinated beam training, the reference signal transmission from each transmission-reception point sharing a common modulation symbol.

Some examples of the method, apparatuses, and non-transitory computer-readable medium described herein may further include operations, features, means, or instructions for estimating an effective channel for the number of supported antennas at the UE, and where determining the beam weights for coordinated reception at the UE may be based on the estimating.

In some examples of the method, apparatuses, and non-transitory computer-readable medium described herein, estimating the effective channel further may include operations, features, means, or instructions for determining, as part of a per-antenna sampling, a received signal estimate for an antenna of the number of supported antennas at the UE with a distinct time-sample of the set of resources.

In some examples of the method, apparatuses, and non-transitory computer-readable medium described herein, estimating the effective channel further may include operations, features, means, or instructions for determining, as part of a unitary matrix sampling, a received signal estimate for the number of supported antennas at the UE with a distinct time-sample of the set of resources.

Some examples of the method, apparatuses, and non-transitory computer-readable medium described herein may further include operations, features, means, or instructions for selecting a subarray of antennas from a set of supported subarrays of antennas at the UE, and where the coordinated beam training may be based on the selecting.

Some examples of the method, apparatuses, and non-transitory computer-readable medium described herein may further include operations, features, means, or instructions for determining a set of beam weights at the UE based on the coordinated beam training, and where determining the beam for coordinated reception may be based on determining the set of beam weights.

In some examples of the method, apparatuses, and non-transitory computer-readable medium described herein, receiving the coordinated beamformed transmission further may include operations, features, means, or instructions for simultaneously receiving the same information bits from each transmission-reception point of the set of transmission-reception points.

In some examples of the method, apparatuses, and non-transitory computer-readable medium described herein, the set of resources includes contiguous channel state information reference signal resources.

In some examples of the method, apparatuses, and non-transitory computer-readable medium described herein, the coordinated beamformed transmission may be part of a coordinated multipoint transmission by the set of transmission-reception points.

A method of wireless communication at a transmission-reception point is described. The method may include receiving an indication of a number of supported antennas at a UE for signal reception, determining a beam for a coordinated beam training over a set of resources, the set of resources based on the number of supported antennas at the UE, transmitting, to the UE, a reference signal over the beam as part of the coordinated beam training with one or more additional transmission-reception points, and transmitting, to the UE, a beamformed transmission over the beam, the beamformed transmission coordinated with at least one beamformed transmission of the one or more additional transmission-reception points.

An apparatus for wireless communication at a transmission-reception point is described. The apparatus may include a processor, memory in electronic communication with the processor, and instructions stored in the memory. The instructions may be executable by the processor to cause the apparatus to receive an indication of a number of supported antennas at a UE for signal reception, determine a beam for a coordinated beam training over a set of resources, the set of resources based on the number of supported antennas at the UE, transmit, to the UE, a reference signal over the beam as part of the coordinated beam training with one or more additional transmission-reception points, and transmit, to the UE, a beamformed transmission over the beam, the beamformed transmission coordinated with at least one beamformed transmission of the one or more additional transmission-reception points.

Another apparatus for wireless communication at a transmission-reception point is described. The apparatus may include means for receiving an indication of a number of supported antennas at a UE for signal reception, determining a beam for a coordinated beam training over a set of resources, the set of resources based on the number of supported antennas at the UE, transmitting, to the UE, a reference signal over the beam as part of the coordinated beam training with one or more additional transmission-reception points, and transmitting, to the UE, a beamformed transmission over the beam, the beamformed transmission coordinated with at least one beamformed transmission of the one or more additional transmission-reception points.

A non-transitory computer-readable medium storing code for wireless communication at a transmission-reception point is described. The code may include instructions executable by a processor to receive an indication of a number of supported antennas at a UE for signal reception, determine a beam for a coordinated beam training over a set of resources, the set of resources based on the number of supported antennas at the UE, transmit, to the UE, a reference signal over the beam as part of the coordinated beam training with one or more additional transmission-reception points, and transmit, to the UE, a beamformed transmission over the beam, the beamformed transmission coordinated with at least one beamformed transmission of the one or more additional transmission-reception points.

Some examples of the method, apparatuses, and non-transitory computer-readable medium described herein may further include operations, features, means, or instructions for receiving, from the UE, an indication including a set of co-phasing factors within an antenna panel at the transmission-reception point.

Some examples of the method, apparatuses, and non-transitory computer-readable medium described herein may further include operations, features, means, or instructions for determining a set of beam weights at the transmission-reception point based on the indication, and where determining the beam for the coordinated beam training may be based on determining the set of beam weights.

Some examples of the method, apparatuses, and non-transitory computer-readable medium described herein may further include operations, features, means, or instructions for transmitting beam swept synchronization signals to the UE, and where receiving the indication may be based on the transmitting.

In some examples of the method, apparatuses, and non-transitory computer-readable medium described herein, the set of co-phasing factors within the antenna panel may be associated with distinct clusters of a channel, the channel supporting communication between the transmission-reception point and the UE.

In some examples of the method, apparatuses, and non-transitory computer-readable medium described herein, the indication further includes a first set of beams for non-coordinated transmission by the transmission-reception point and a signal strength for a set of beam pairs, each beam pair of the set of beam pairs including a beam of the first set of beams and a beam of a second set of beams for reception at the UE.

Some examples of the method, apparatuses, and non-transitory computer-readable medium described herein may further include operations, features, means, or instructions for coordinating with the one or more additional transmission-reception points via a backhaul link, and where transmitting the reference signal over the beam as part of the coordinated beam training may be based on the coordinating.

In some examples of the method, apparatuses, and non-transitory computer-readable medium described herein, transmitting the beamformed transmission further may include operations, features, means, or instructions for simultaneously transmitting the same information bits with the at least one beamformed transmission of the one or more additional transmission-reception points.

Some examples of the method, apparatuses, and non-transitory computer-readable medium described herein may further include operations, features, means, or instructions for receiving a request from the UE for the coordinated beam training, and where determining the beam for the coordinated beam training may be based on the receiving.

In some examples of the method, apparatuses, and non-transitory computer-readable medium described herein, the reference signal shares a common modulation symbol with at least one reference signal transmission of the one or more additional transmission-reception points.

In some examples of the method, apparatuses, and non-transitory computer-readable medium described herein, the set of resources includes contiguous channel state information reference signal resources.

In some examples of the method, apparatuses, and non-transitory computer-readable medium described herein, the beamformed transmission may be part of a coordinated multipoint transmission by the transmission-reception point and the one or more additional transmission-reception points.

DETAILED DESCRIPTION

Figure 1:
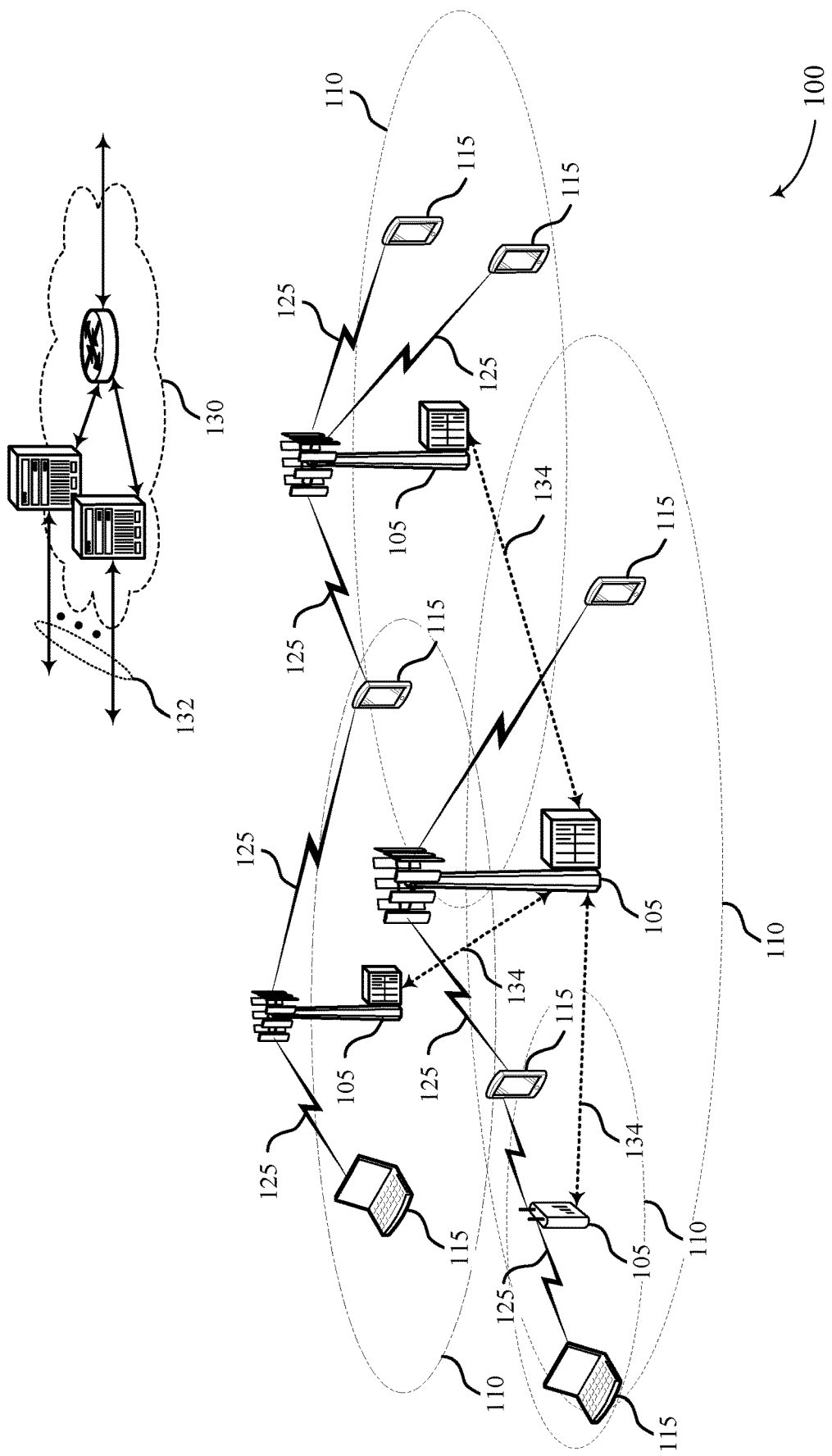
FIG. 1 illustrates an example of a wireless communications system that supports techniques for coordinated beamforming in millimeter wave systems in accordance with aspects of the present disclosure.

A wireless communication system may operate in mmW frequency ranges, e.g., 26 GHz, 28 GHz, 39 GHz, 57-71 GHz, etc. Signal processing techniques, such as beamforming, may be used by wireless communication devices of the system. For example, a transmitting device (e.g., a transmission and reception point (TRxP)) can coherently combine transmission energy over one or more antenna elements, and overcome the path losses at an operating frequency. In other examples, a receiving device (e.g., a user equipment (UE)) may use beamforming techniques to configure antenna elements for directional signal reception. The wireless communication devices may rely on beam management procedures to monitor the performance of active beams and identify candidate beams that can be utilized in the event the active beam becomes unavailable or otherwise unusable (e.g., fading, blockage, etc.).

As demand for communication access increases, directional transmissions through beamformed signaling on mmW frequency ranges may support enhanced communication capability. However, conventional beamforming techniques may emphasize single entity communications, such as transmissions between a single TRxP and a single UE. In some examples, due to the sparsity of channels and the use of larger antenna arrays at a UE or a TRxP, beamforming in a mmW network may be more directional than in sub-6 GHz systems. Wireless communications that operate in mmW frequency ranges may include support for identifying clusters of a channel. A cluster may refer to an object in the wireless channel between the transmitting device and the receiving device. A cluster in the channel corresponds to the dominant reflection or scattering or diffraction (mode of communication) by which the energy transmitted by the transmit device is received by the receive device. Thus, clusters capture the channel matrix between the transmit and receive device. Directional characteristics of the channel may lead to signaling over distinct clusters in the wireless channel. Broadly, clusters may have multiple paths/rays over a narrow/wide angular spread. Depending on the environment, there could be small (e.g., 1 or 2) or a large (e.g., 5-7) number of clusters in the channel. Example scenarios where small number of clusters may prevail include, but are not limited to, outdoor or suburban environments. Example scenarios where large number of clusters may prevail include, but are not limited to, indoor (e.g., office, mall, stadia) environments Generally, beamforming or beam management techniques in a mmW network may include the identification of distinct clusters. For example, clusters may be distinct/spatially separated and therefore can be used for well-separated/low-interference multi-user beam designs, including coordinated multi-point transmissions. Transmissions between a single TRxP and a single UE may fail to realize signaling capability for directional transmissions, including beamformed signal power associated with multiple clusters of a channel. Moreover, conventional techniques for beamformed signaling in mmW systems may not support identifying multiple clusters of a channel or realizing performance capability associated with directional channel characteristics, especially for multiple TRxPs. Specifically, conventional beamforming (such as P-1,2,3 procedures) may assume uncoordinated communication between a single TRxP and a single UE. Such conventional techniques may not provide a mechanism for utilizing the directional nature of mmW channel resources or achieving a capable signal performance.

Aspects of the disclosure are initially described in the context of a wireless communications system. Generally, the described techniques provide mechanisms for CoMP transmission by a plurality of TRxPs to a UE as part of a coordinated beam training. In some examples, the described techniques provide support for identifying co-phasing factors within a single antenna panel of a TRxP for co-phasing multiple clusters in the channel. A supported antenna array of the TRxP may support multiple antenna panels and the TRxP may receive feedback for identifying co-phasing factors for each antenna panel. The TRxP may identify the co-phasing factors as a means to generate beam weights (i.e., associated with the antenna elements of a respective antenna panel) for a beamforming vector approximation. The TRxP may coordinate with additional TRxPs via one or more backhaul links and initiate the coordinated beam training within a common modulation symbol, and over a contiguous set of time and frequency resources (e.g., channel state information reference signal (CSI-RS) resource opportunities).

In some examples, the set of time and frequency resources may be based on a number of supported antennas at the UE, and signaled to the plurality of TRxPs. The UE may receive reference signal transmissions by the plurality of TRxPs over the approximated beams and estimate an effective channel on the supported antennas. Based on the effective channel estimation, the UE may then determine a matched filtering beam estimate for coordinated reception. CoMP transmissions from the plurality of TRxPs may follow the estimation and may be received by the UE on the determined beam. Accordingly, the wireless devices, including the multiple TRxPs and the UE, may determine a higher ranked approximation of multiple clusters in the channel in generating the beamforming vector. CoMP transmissions based on the coordinated beam training may provide an enhanced signal performance (e.g., rate or signal to noise ratio (SNR) improvement) and improved robustness via directional or beam diversity on the channel. Beneficially, enhanced signal performance in reception may assist one or more integrated circuits (e.g., modems, processors, etc.) of the UE to perform effective channel estimation.

Aspects of the disclosure are further illustrated by and described with reference to apparatus diagrams, system diagrams, and flowcharts that relate to techniques for coordinated beamforming in millimeter wave systems.

FIG. 1 illustrates an example of a wireless communications system 100 that supports techniques for coordinated beamforming in millimeter wave systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some examples, UEs 115 may be designed to support critical functions (e.g., mission critical functions), and a wireless communications system 100 may be configured to provide ultra-reliable communications for these functions.

In some examples, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

Beamforming operations may include beam management techniques at a transmitting device (e.g., the base station 105) and the receiving device (e.g., the UE 115). In some examples, beam management techniques may be based on different beam widths. For example, beam management may use a P1/P2/P3 procedure, with a P1 beam having a wider beam width than a P2 or a P3 beam, e.g., begin with a wide beam-width and hierarchically move to a narrower beam-width on base station side with a P2 beam and at the UE side with a P3 beam. In some examples, the P1 beam may be performed over a secondary synchronization signal block (SSB), whereas a P2/P3 procedure may be performed over a channel state information reference signal (CSI RS).

Generally, beam management may include the transmitting device (e.g., the base station 105) transmitting and the receiving device (e.g., the UE 115) scanning using a codebook of a fixed size (e.g., all entries for P1 beams). The receiving device may determine the RSRP estimates for all beam pairs to form an RSRP table. In some examples, the receiving device may average RSRP values over multiple sub-bands or multiple symbols for SNR enhancement. Broadly, each entry in the RSRP table may correspond to an RSRP value obtained by the receiving device that corresponds to a particular beam pair. The beam pairing may refer to the transmit beam index from the transmitting device and the receive beam index of the receiving device used to determine the RSRP value. The receiving device may create the RSRP table and identify the best beams (e.g., the highest RSRP or gain values) to be included in a beam measurement report transmitted to the transmitting device. For each included RSRP value in the measurement report, the receiving device may include corresponding transmit beam index of the transmitting device, e.g., the transmitting device may be unaware of which receive beam of the receiving device was used to obtain the RSRP value. In some examples, the transmitting device may configure or otherwise inform the receiving device of how many best beams to report and the beam measurement report, e.g., by signaling or configuring the receiving device to include K best beams in the measurement report.

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support multiple communication links 125 between a UE 115 and base station 105, also referred to herein as transmission-reception points (TRxPs). For example, wireless communications system 100 may include at least a first TRxP 105 and a second TRxP 105. The first TRxP 105 and the second TRxP 105 may coordinate via a backhaul link 134. The backhaul link may support enhanced network deployment and dense network integration across one or more supported coverage areas 110.

The communication links 125 of wireless communication system 100 may operate in mmW frequency ranges, e.g., 26 GHz, 28 GHz, 39 GHz, 42 GHz, 57-71 GHz or beyond 52.6 GHz, etc. Signal processing techniques, such as beamforming, may be used by the plurality of TRxPs 105 and UEs 115 for directional transmission. In some examples, the TRxPs 105 may support CoMP transmissions, as a means to utilize the mmW resources and directional capabilities of supported channels by the communication links 125. The CoMP transmissions may enhance signaling capability associated with the beamformed transmissions and improve channel estimation.

In some examples, the CoMP transmissions may include using directional beam estimates from multiple TRxPs 105 for transmission. Each TRxP 105 may individually implement a beam training with a UE 115 (e.g., according to P-1,2,3 procedures). For example, a first TRxP 105 may train the UE 115 by transmitting beam swept synchronization signals. The beam swept synchronization signals may be associated with phase shifter combinations for antenna elements (or beam weights) of the first TRxP 105 configured by a finite-precision codebook $F_1=\{c_1, \ldots, c_M\}$. Similarly, the second TRxP 105 may train the UE 115 by transmitting beam swept synchronization signals. The beam swept synchronization signals may be associated with phase shifter combinations for antenna elements (or beam weights) of the second TRxP 105 configured by a finite-precision codebook $F_2=\{d_1, \ldots, d_N\}$. The UE 115 may receive the beam swept synchronization signals of the TRxPs 105 and train one or more receive beams according to a configured codebook $G=\{e_1, \ldots, e_P\}$.

Based on the individual beam trainings by the first TRxP 105 and the second TRxP 105, the UE 115 may determine the best beam pairs for communication associated with each of the respective TRxPs 105. The UE 115 may determine the beam pairs according to the beam indices associated with the beam training and include a selected beam f for transmission by the respective TRxP 105 and a selected beam g for reception at the UE. For example, the UE 115 may determine a best beam pairfi, $f_{1, opt}=c_i$ and $g_{1, opt}=e_k$ based on the beam training initiated by the first TRxP 105. In other examples, the UE 115 may determine a best beam pairfi, $f_{2, opt}=d_j$ and $g_{2, opt}=e_l$ based on the beam training initiated by the second TRxP 105. The UE 115 may then measure the received signal power levels (e.g., gain or reference signal received power (RSRP) levels) for beam pairs associated with the identified best beams of the beam trainings. The RSRP for selected beam pair for the beam training initiated by the first TRxP 105 may be denoted $RSRP_{ki}$ and the RSRP for the selected beam pair for the beam training initiated by the second TRxP 105 may be denoted $RSRP_{ij}$.

The UE 115 may transmit feedback to the TRxPs 105, the feedback including the identified indices and measured RSRP values associated with the best beams of the beam trainings individually initiated by the first TRxP 105 and the second TRxP 105. The best beam pair selections included in the transmitted feedback for each of the TRxPs 105 may correspond to a rank-1 approximation of the effective channels associated with the resources of each communication link 125. Based on the feedback, each of the first TRxP 105 and the second TRxP 105 may identify a generated beam for beamformed transmission as part of the CoMP transmission. For example, the first TRxP 105 may identify a best beam index and determine one or more beam weights for the generated beam associated with the index $c_i$, value. Similarly, the second TRxP 105 may identify a best beam index $d_j$ and determine one or more beam weights for the generated beam associated with the index value.

The UE 115 may determine one or more co-phasing factors (e.g., co-phasing factors or co-phasing correction factors) as part of an effective channel and receive beam estimate for signaling reception. The co-phasing factors may be determined up to modulo quantization constraints (e.g., a finite set of phase shifter values may be allowed). The UE 115 may determine the co-phasing factors after identifying the one or more best beams for transmission by the TRxPs 105 and based on the individual beam trainings. For example, the UE 115 may determine a symbol estimate (e.g., the post-beamformed complex signal/symbol estimate) associated with each of the one or more selected beams (e.g., for the best beam pair, or beam satisfying a strength/quality threshold, with each of the multiple TRxPs 105).

The symbol estimates may be based on the selected beam pair for a TRxP 105, the channel H associated with the communication link 125, the pre-beamforming SNR of the link between the UE 115 and the TRxP 105, ρ, and the additive noise added at the UE when the reception is made with a low noise amplifier n (e.g., a random quantity). For example, the UE 115 may determine a symbol estimate for reception associated with transmission by the first TRxP 105 over the determined best beam pair $f_{1,\,opt}=c_i$ and $g_{1,\,opt}=e_k$ according to Equation (1), reproduced below.

$$\hat{s}_1 = e_k^H \cdot (\sqrt{\rho_1} H_2 N_1 c_i s + N_1) \qquad (1)$$

In other examples, the UE 115 may determine a symbol estimate for reception associated with transmission by the second TRxP 105 over a determined best beam pair $f_{2,\,opt}=d_j$ and $g_{2,\,opt}=e_l$ according to Equation (2), reproduced below.

$$\hat{s}_2 = e_l^H \cdot (\sqrt{\rho_2} H_2 d_j s + N_2) \qquad (2)$$

As described herein, determining the one or more co-phasing factors at UE 115 may include correlating (e.g., a plurality of correlations) the complex signal/symbol estimates to obtain the co-phasing factors according to Equation (3), reproduced below.

$$\varphi = <\hat{s}_1 \cdot \hat{s}_2> \qquad (3)$$

Based on the determined co-phasing factors, the UE 115 may estimate an effective channel for the CoMP reception and determine a combining beam g (e.g., also referred to as the matched filtering beam). The UE 115 may use the combining beam for reception of the CoMP transmission of the multiple TRxPs 105. The combining beam determination may be based on the selected beam pairs, the co-phasing factors, and the signal strengths, as shown in equation (4), reproduced below:

$$g = \frac{\sqrt{RSRP_{ki}^{(1)}} \cdot e_k + e^{j\phi} \cdot \sqrt{RSRP_{lj}^{(2)}} \cdot e_l}{\left\| \sqrt{RSRP_{ki}^{(1)}} \cdot e_k + e^{j\phi} \cdot \sqrt{RSRP_{lj}^{(2)}} \cdot e_l \right\|} \qquad (4)$$

The UE 115 may receive coordinated beamformed transmissions from the first TRxP 105 and the second TRxP 105 as part of a CoMP transmission. The coordinated beamformed transmissions may be transmitted over the selected best beams of the respective TRxPs 105, as indicated by the beam indices $f_{1,\,opt}=c_i$ and $f_{2,\,opt}=d_j$. The UE 115 may receive the coordinated beamformed transmissions via the determined combining beam g and based on the measured co-phasing factors.

As described herein, the methods for single beam transmission at the set of TRxPs 105 and receive beam estimation for CoMP reception at the UE 115 may support enhanced signal improvement relative to single TRxP selection and directional beam selection and reporting. For example, a pair to TRxPs 105 supporting 16 antennas and a UE 115 supporting 4 antennas for directional communication over a pair of associated channels, the associated devices may experience increased signal performance (e.g., 2.5 dB received SNR gain for 2 clusters, 3.5 dB received SNR gain for 6 clusters) relative to single TRxP and beam selection by the UE 115.

However, the above-described methods may not satisfy the necessary signal performance that may be possible on the associated channels. Specifically, a single beamforming vector approximation at the TRxPs 105 may provide a low rank approximation of channel characteristics, including co-phasing factors of the clusters within the channel. Moreover, the described methods may provide limited indication of robustness for beam or directional diversity on the channel. For example, channel estimation according to the described methods may incur reduced reliability in instances of signal obstruction or blockage to antenna subarrays of the associated communication devices (e.g., blockage by hand, body, etc.).

As described herein, for multi-cluster mmW channel structures, higher-rank approximations may be determined according to a multi-beamforming vector approximation for CoMP transmission. The UE 115 may perform multi-beam selection and co-phasing information feedback to each TRxP 105 of a multi-TRxP environment. The TRxPs 105 may use the received feedback to form channel approximations (e.g., rank-2, rank-3, etc.) and generate a set of beam weights for combining beams. Specifically, each of the TRxPs 105 may receive co-phasing factors within a single antenna panel of the respective device, for co-phasing multiple clusters in the channel. The TRxPs 105 may receive co-phasing factors for each supported antenna panel of a configured antenna array. The TRxPs 105 may then use the approximated beams for coordinated beam training at the UE 115, and subsequent coordinated beamformed transmission. The UE 115 may receive reference signal transmissions from the TRxPs 105 (e.g., as part of the coordinated beam training) over one or more time samples to estimate an effective channel for signaling reception. Based on the channel estimation, the UE 115 may determine a combining beam g (e.g., also referred to as the matched filtering beam). The UE 115 may use the combining beam for reception of a CoMP transmission by the multiple TRxPs 105.

Multi-beamforming vector approximation for CoMP transmission may support an improved (e.g., higher rank) approximation of the appropriate channels and co-phasing factors for the included channel clusters. Such methods may provide enhanced signal improvement relative to the alternative methods described above. For example, a pair to TRxPs 105 supporting 16 antennas and a UE 115 supporting 4 antennas for directional communication over a pair of associated channels, the associated devices may experience increased signal performance (e.g., dB received SNR gain for 6 clusters) relative to single beam selection for multi-TRxP CoMP transmission.

Figure 2:
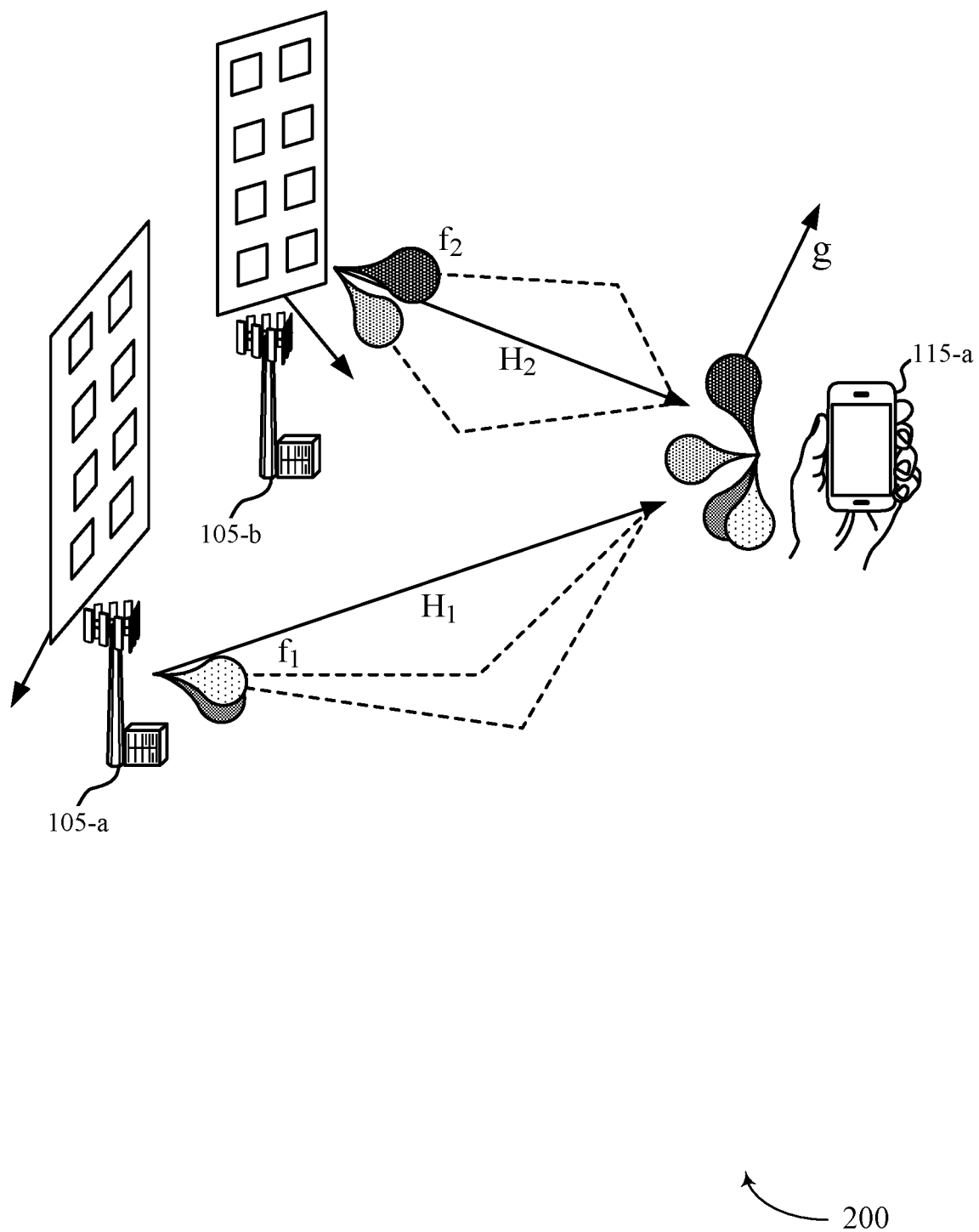
FIG. 2 illustrates an example of a wireless communications system that supports techniques for coordinated beamforming in millimeter wave systems in accordance with aspects of the present disclosure.

FIG. 2 illustrates an example of a wireless communications system 200 that supports techniques for coordinated beamforming in millimeter wave systems in accordance with aspects of the present disclosure. Wireless communications system 200 may include a receiving device, such as a UE 115-a, and a plurality of transmitting devices, such as TRxPs 105-a and 105-b, which may be examples of the corresponding devices described with reference to FIG. 1.

The UE 115-a may support communication links with both TRxP 105-a and TRxP 105-b. Time and frequency resources associated with the communication links support a first channel $H_1$ between the TRxP 105-*a* and the UE 115-*a*, and a second channel $H_2$ between the TRxP 105-*b* and the UE 115-*a*. Each of channels $H_1$ and $H_2$ may operate on mmW frequency ranges. Each of the TRxPs 105 may support antenna panels containing multiple antenna elements, as shown. The UE 115-*a* may support multiple antenna sub-arrays within a radio frequency integrated circuit (RFIC). Due to the sparsity of channels and the use of larger antenna arrays for beamforming, mmW resources of the channels $H_1$ and $H_2$ may be more directional than in sub-6 GHz systems. In some examples, this may lead to signaling over distinct clusters in the wireless channels.

As described herein, wireless communications system 200 may support communications enhancements for CoMP transmission over the channels $H_1$ and $H_2$, including multi-beamforming vector approximation for co-phasing multiple clusters in the channels. The CoMP transmissions may enhance signaling capability associated with the beamformed transmissions and improve channel estimation.

In some examples, the CoMP transmission may include using directional beam estimates from multiple TRxPs 105 for transmission. Each TRxP 105 may individually implement a beam training with the UE 115-*a* (e.g., according to P-1,2,3 procedures). For example, TRxP 105-*a* may train the UE 115-*a* by transmitting beam swept synchronization signals. The beam swept synchronization signals may be associated with phase shifter combinations for antenna elements of the antenna panel supported by TRxP 105-*a*. The beam swept sychronization signals may be configured according a finite-precision codebook $F_1=\{c_1, \ldots, c_M\}$ for the TRxP 105-*a*. In other examples, the second TRxP 105-*b* may train the UE 115-*a* by transmitting beam swept synchronization signals. The beam swept synchronization signals may be associated with phase shifter combinations for antenna elements of the antenna panel supported by TRxP 105-*b*. The beam swept synchronization signals may be configured by a finite-precision codebook $F_2=\{d_1, \ldots, d_N\}$. The UE 115-*a* may receive the beam swept synchronization signals of the TRxPs 105 and train one or more receive beams according to a configured codebook $G=\{e_1, \ldots, e_P\}$.

Based on the individual beam trainings by the TRxP 105-*a* and the TRxP 105-*b*, the UE 115-*a* may select multiple beams pairs for the respective channels $H_1$ and $H_2$. The UE 115-*a* may determine the beam pairs according to the beam indices associated with the beam training. For example, the UE 115-*a* may determine a best beam pair $f_{1,\ opt1}=c_i$ and $g_{1,\ opt1}=e_k$ based on the beam training initiated by the TRxP 105-*a*. Additionally, the UE 115-*a* may determine a second best beam pair $f_{1,\ opt2}=c_m$ and $g_{1,\ opt2}=e_o$ based on the beam training initiated by the TRxP 105-*a*. In other examples, the UE 115 may determine a best beam pair $f_{2,\ opt1}=d_j$ and $g_{2,\ opt1}=e_1$ based on the beam training initiated by the TRxP 105-*b*. Additionally, the UE 115-*a* may determine a second best beam pair $f_{2,\ opt2}=d_n$ and $g_{2,\ opt2}=e_p$ based on the beam training initiated by the TRxP 105-*b*. By selecting multiple beam pairs of the beam swept synchronization signals by the TRxPs 105, the UE 115-*a* may determine a higher rank (e.g., rank-2) approximation of the channels $H_1$ and $H_2$.

The UE 115-*a* may measure the received signal levels (e.g., gain or reference signal received power (RSRP) levels) for the selected beam pairs associated with the individual beam trainings by the TRxP 105-*a* and the TRxP 105-*b*. For example, the UE 115-*a* may determine an RSRP value for the best beam pair $f_{1,\ opt1}=c_i$ and $g_{1,\ opt1}=e_k$ associated with TRxP 105-*a*, denoted by $RSRP^{(1)}_{ki}$. Additionally, the UE 115-*a* may determine an RSRP value for the second best beam pair $f_{1,\ opt2}=c_m$ and $g_{1,\ opt2}=e_o$ associated with TRxP 105-*a*, denoted by $RSRP^{(1)}_{om}$. In other examples, the UE 115-*a* may determine an RSRP value for the best beam pair $f_{2,\ opt1}=d_j$ and $g_{2,\ opt1}=e_1$ associated with TRxP 105-*b*, denoted by $RSRP^{(2)}_{lj}$. Additionally, the UE 115-*a* may determine an RSRP value for the second best beam pair $f_{2,\ opt2}=d_n$ and $g_{2,\ opt2}=e_p$ associated with TRxP 105-*a*, denoted by $RSRP^{(2)}_{pn}$.

The UE 115-*a* may then determine co-phasing factors (e.g., co-phasing factors or co-phasing correction factors) for each of the TRxPs 105-*a* and 105-*b* as part of an effective channel and receive beam estimate for signaling reception on the channels $H_1$ and $H_2$. For example, the UE 115-*a* may determine a symbol estimate (e.g., the post-beamformed complex signal/symbol estimate) associated for each of the one or more selected beam pairs (e.g., for the best beam pair, or beam satisfying a strength/quality threshold) of the beam training by TRxP 105-*a*. As described with reference to equation (1), provided above, the UE 115-*a* may determine a symbol estimation for the selected best beam pair $f_{1,\ opt1}=c_i$ and $g_{1,\ opt1}=e_k$. Similarly, the UE 115-*a* may determine a symbol estimation for the selected second best beam pair $f_{1,\ opt2}=c_m$ and $g_{1,\ opt2}=e_o$ associated with TRxP 105-*a*, based on equation (5) reproduced below.

$$\widehat{s_{1,2}} = e_o^H \cdot (\sqrt{\rho_1} H_1 c_m s + N_1) \tag{5}$$

The symbol estimate may be based on the selected second best beam pair $f_{1,\ opt2}=c_m$ and $g_{1,\ opt2}=e_o$, the channel $H_1$, the pre-beamforming SNR of the link between the UE 115-*a* and the TRxP 105-*a*, $\rho$, and the additive noise (e.g., $N_1$) added at the UE 115-*a* when the reception is made with a low noise amplifier.

In other examples, the UE 115-*a* may determine a symbol estimate for each of the one or more selected beam pair of the beam training for TRxP 105-*b*. The UE 115-*a* may determine a symbol estimation for the selected best beam pair $f_{2,\ opt1}=d_j$ and $g_{2,\ opt1}=e_1$ associated with TRxP 105-*b*, based on equation (6) reproduced below.

$$\widehat{s_{2,1}} = e_l^H \cdot (\sqrt{\rho_2} H_2 d_j s + N_2) \tag{6}$$

The symbol estimate may be based on the selected second best beam pair $f_{2,\ opt1}=d_j$ and $g_{2,\ opt1}=e_1$, the channel $H_2$, the pre-beamforming SNR of the link between the UE 115-*a* and the TRxP 105-*b*, $\rho$, and the additive noise (e.g., $N_2$) added at the UE 115-*b* when the reception is made with a low noise amplifier. Similarly, the UE 115-*a* may determine a symbol estimate for the selected second best beam pair $f_{2,\ opt2}=d_n$ and $g_{2,\ opt2}=e_p$ associated with the TRxP 105-*b*, based on equation (7) reproduced below.

$$\widehat{s_{2,2}} = e_p^H \cdot (\sqrt{\rho_2} H_2 d_n s + N_2) \tag{7}$$

The UE 115-*a* may then determine one or more co-phasing factors (e.g., co-phasing factors or co-phasing correction factors) for the selected beam pairs associated with the TRxPs 105-*a* and 105-*b* as part of an effective channel and receive beam estimate for signaling reception. The co-phasing factors may correspond to modulo quantization constraints. The determined co-phasing factors may be directed to antenna elements of a single antenna panel for each of the respective TRxPs 105-*a* and 105-*b*. Determining the one or more co-phasing factors at UE 115-*a* may include correlating (e.g., a plurality of correlations) the complex signal/symbol estimates to obtain the co-phasing factors. For example, the UE 115-*a* may determine the set of co-phasing factors for generating beam weights within an antenna panel at the TRxP 105-*a*, according to equation (8) reproduced below.

$$\phi_1 = <\widehat{s_{1,1}} \cdot \widehat{s_{1,2}} \text{ and } \phi_2 = <\widehat{s_{1,2}} \cdot \widehat{s_{1,1}} \tag{8}$$

In other examples, the UE 115-a may determine the set of co-phasing factors for generating beam weights within an antenna panel at the TRxP 105-b, according to equation (9) reproduced below.

$$\phi_3 = <\widehat{s_{2,1}} \cdot \widehat{s_{2,2}} \text{ and } \phi_4 = <\widehat{s_{2,2}} \cdot \widehat{s_{2,1}} \qquad (9)$$

In some examples, the co-phasing factors may change dynamically over time, for example, due to phase noise or carrier frequency offset (CFO). After the initial alignment, which may be performed at different times, the TRxPs 105-a and 105-b may initiate a subsequent individual beam training, and the UE 115-a may determine a separate estimation of the co-phasing factors $\phi_1$ through $\phi_4$. Additionally, each of TRxPs 105-a and 105-b may be configured for modular operations associated with mmW frequency ranges and support an antenna arrays that include multiple antenna panels. The UE 115-a may determine the set of co-phasing factors for each supported antenna panel at the TRxPs 105-a and 105-b.

The UE 115-a may transmit individual feedback messages to the TRxPs 105-a and 105-b. For example, the feedback for TRxP 105-a may include the selected beam pairs $f_{1,\ opt1}=c_i$ and $g_{1,\ opt1}=e_k$ and $f_{1,\ opt2}=c_m$ and $g_{1,\ opt2}=e_o$. The feedback for TRxP 105-a may also include the measured RSRP values of the beam pairs, denoted by $RSRP^{(1)}_{ki}$ and $RSRP^{(1)}_{om}$. The feedback for TRxP 105-a may also include the determined co-phasing factors $\phi_1$ and $\phi_2$ of the selected beam pairs. In other examples, the feedback for TRxP 105-b may include the selected beam pairs $f_{2,\ opt1}=d_j$ and $g_{2,\ opt1}=e_l$ and $f_{2,\ opt2}=d_n$ and $g_{2,\ opt2}=e_p$. The feedback for TRxP 105-b may also include the measured RSRP values $RSRP^{(2)}_{lj}$ and $RSRP^{(2)}_{pn}$, as well as the determined co-phasing factors $\phi_3$ and $\phi_4$.

Based on the feedback, the TRxPs 105-a and 105-b may process the received feedback information and process the included beam pair indices, RSRP values, and co-phasing factors for generating beam weights associated with a combined beamformed transmission. The combined beamformed transmission may co-phasing antenna elements within an antenna panel supported at the TRxP 105-a or 105-b, for co-phasing multiple clusters in the respective channel (e.g., $H_1$ or $H_2$). For example, the TRxP 105-a may determine a combined beam $f_1$ according to equation (10) reproduced below.

$$f_1 = \frac{e^{j\phi_1}\sqrt{RSRP^{(1)}_{ki}} \cdot c_i + e^{j\phi_2}\sqrt{RSRP^{(1)}_{om}} \cdot c_m}{\left\| e^{j\phi_1}\sqrt{RSRP^{(1)}_{ki}} \cdot c_i + e^{j\phi_2}\sqrt{RSRP^{(1)}_{om}} \cdot c_m \right\|} \qquad (10)$$

In other examples, the TRxP 105-b may determine a combined beam $f_2$ according to equation (11) reproduced below.

$$f_2 = \frac{e^{j\phi_3}\sqrt{RSRP^{(2)}_{lj}} \cdot d_j + e^{j\phi_4}\sqrt{RSRP^{(2)}_{pn}} \cdot d_n}{\left\| e^{j\phi_3}\sqrt{RSRP^{(2)}_{lj}} \cdot d_j + e^{j\phi_4}\sqrt{RSRP^{(2)}_{pn}} \cdot d_n \right\|} \qquad (11)$$

Additionally, the UE 115-a may transmit an indication to each of the TRxPs 105-a and 105-b. The indication may include a number of supported antennas N (i.e., within an antenna subarray) at the UE 115-a. The TRxP 105-a and the TRxP 105-b may communicate via a supported backhaul link to coordinate a coordinated beam training with the UE 115-a. The coordinated beam training may include jointly transmitting reference signal indications over the determined combined beams $f_1$ and $f_2$, respectively. The combined beams $f_1$ and $f_2$ may share a modulation (e.g., quadrate amplitude modulation (QAM)) symbol. The TRxPs 105-a and 105-b may perform the coordinated beam training over consecutive time and frequency resources (e.g., channel state information reference signal (CSI-RS) resources) of the channels $H_1$ and $H_2$. The size of the consecutive time and frequency resources may be based on the indicated number of supported antennas (e.g., N) at the UE 115-a.

The UE 115-a may receive the coordinated beam training transmissions of TRxPs 105-a and 105-b and estimate a vector channel for reception. The estimation may be according to one or more time samplings within the consecutive time and frequency resources of the joint beam training. The UE 115-a may perform the time samplings according to the number of supported antennas N. In some examples, the UE 115-a may perform a per-antenna sampling and estimate a received signal of the coordinated beam training at a single antenna of the supported antennas N. The UE 115-a may iteratively perform the estimation for each antenna, over the time samplings. In other examples, the UE 115-a may perform a unitary sampling and estimate a received signal at the supported antennas N over the time samplings. Each time sampling of the unitary sampling may include an orthogonal frequency determination. Following the time samplings, the UE 115-a may determine unitary matrix column-based weights for estimating the effective vector channel for reception over the set of antennas N.

Following the sampling, the UE 115-a may estimate an effective vector channel for reception over the set of antennas N. The estimation may be based on the reference signal reception associated with the coordinated beam training over the combined beams $f_1$ and $f_2$ The UE 115-a may estimate the effective channel h based on equation (12) reproduced below.

$$h=\sqrt{\rho_1}H_1 f_1 s + \sqrt{\rho_2}H_2 f_2 s + n \qquad (12)$$

Based on the estimation, the UE 115-a may determine a normalization of the estimated effective channel h for reception at the antennas of UE 115-a. The normalized effective channel g (e.g., $h/\|h\|$) may correspond to the unit-norm combining beam (e.g., also referred to as the matched filtering beam). As shown, g may be a function of the channels $H_1$ and $H_2$ and may be determined according to the time samplings of the coordinated beam training.

The UE 115-a may then receive a coordinated beamformed transmission from the TRxP 105-a and the TRxP 105-b on the combined beams $f_1$ and $f_2$. The coordinated beamformed transmission may be received on the determined combining beam g. The coordinated beamformed transmission may correspond to a CoMP transmission by the TRxP 105-a and the TRxP 105-b. The coordinated beamformed transmission may be received simultaneously (or near simultaneously) from the TRxP 105-a and the TRxP 105-b. The coordinated beamformed transmission may be a same (e.g., shared, for example, same information bits) signal from the TRxP 105-a and the TRxP 105-b.

As described herein, the UE 115-a may receive the coordinated beamformed transmission from the TRxP 105-a and the TRxP 105-b on the same antenna subarray (e.g., having a similar spatial coverage area). If the transmissions carried over the combined beams $f_1$ and $f_2$ are associated with different antenna subarrays for reception at the UE 115-a, the combining beam g may be a choice across these different subarrays. In this example, the TRxPs 105 may coordinate to transmit in the same time-frequency resource block (RB), but may not involve the exchange of co-phasing information. In other examples, instead of operating two different subarrays with the same time-frequency RB, the UE 115-a may perform subarray selection for receiving the CoMP transmission.

Multi-beamforming vector approximation for CoMP transmission may support an improved (e.g., higher rank) approximation of the appropriate channels and co-phasing factors for the included channel clusters. In particular, the approximation may support co-phasing factors within a single supported panel for the TRxP 105-a and a single supported panel for the TRxP 105-b. Such methods may provide enhanced signal improvement relative to the alternative methods, including a single TRxP and beam selection and single beam selection for multi-TRxP CoMP transmission. Moreover, the multi-beamforming vector approximation may support robustness for beam or directional diversity on the channel. For example, channel estimation according to the described methods may improve reliability in instances of signal obstruction or blockage to antenna subarrays of the associated communication devices (e.g., blockage by hand, body, etc.).

As described herein, the provided methods may correspond to a rank-2 approximation of the supported channels. The disclosure is not limited to the provided example or methods, and may support capability for any generalized number of higher rank multi-beamforming vector approximation (e.g., rank-3, rank-4, etc.). In addition, the coordinated beam training and coordinated beamformed transmission (e.g., CoMP transmission) may be supported by a plurality of TRxPs 105 in supplement to the provided example of the TRxPs 105-a and 105-b.

Figure 3:
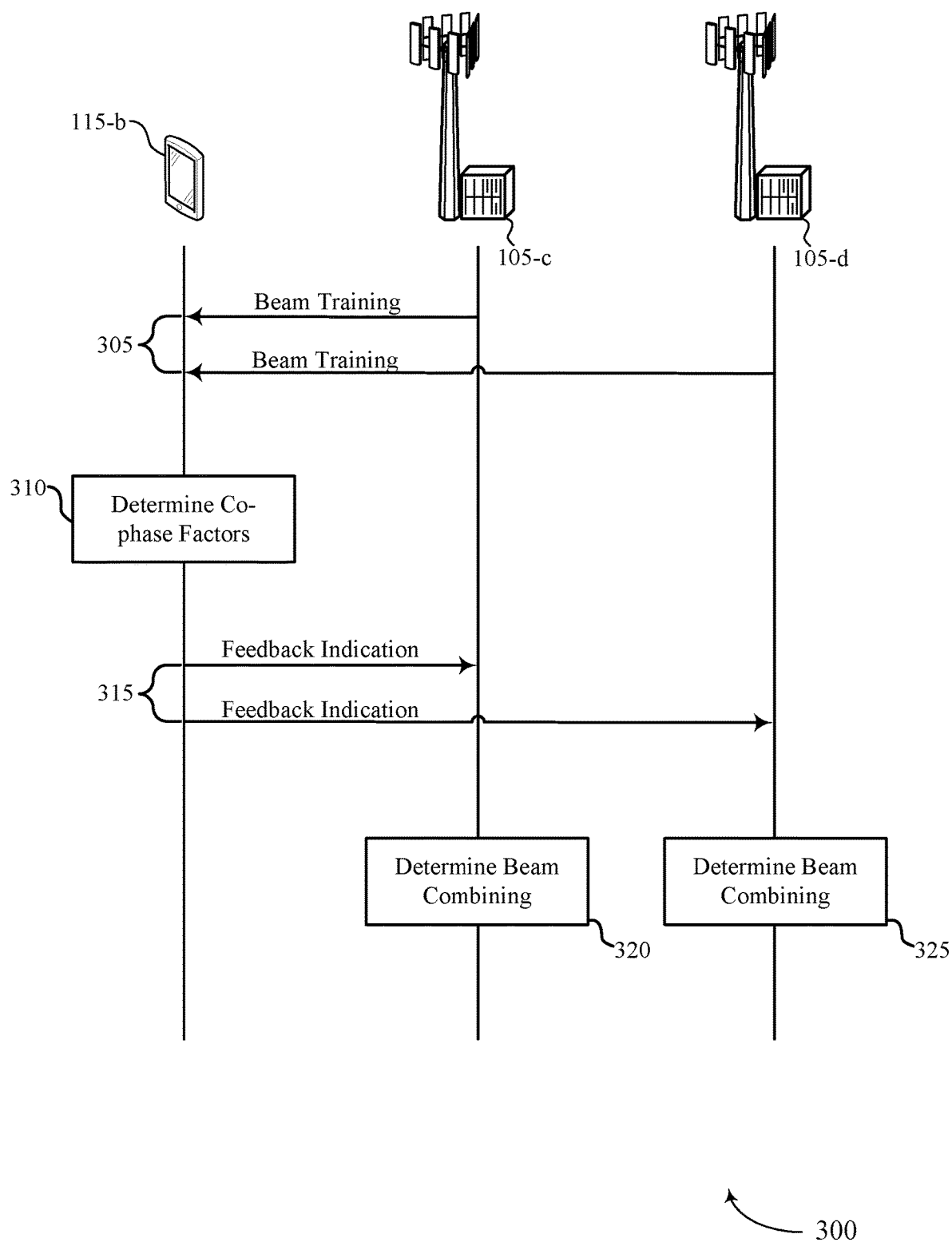
FIG. 3 illustrates an example of a process flow that supports techniques for coordinated beamforming in millimeter wave systems in accordance with aspects of the present disclosure.

FIG. 3 illustrates an example of a process flow 300 that supports techniques for coordinated beamforming in millimeter wave systems in accordance with aspects of the present disclosure. The process flow 300 may include a UE 115-b, a base station 105-c, and a base station 105-d, which may be examples of the corresponding devices described with reference to FIGS. 1 and 2. As described herein, the base station 105-c and the base station 105-d may be referred to herein as TRxPs. The described communications devices may implement one or more methods for determining multi-beam combining at the TRxPs 105-c and 105-d, as discussed herein. Alternative examples of the following may be implemented, where some steps may be performed in a different order than described or not performed at all. In some examples, steps may include additional features not mentioned below, or further steps may be added.

At 305, each of the TRxPs 105-c and 105-d may perform individual beam training with the UE 115-b. For example, the TRxP 105-c may transmit beam swept synchronization signals to the UE 115-b. The beam swept synchronization signals may be associated with phase shifter combinations for antenna elements of the antenna panel supported by TRxP 105-c. The beam swept sychronization signals may be configured according a finite-precision codebook $F_1 = \{c_1 \ldots, c_M\}$ for the TRxP 105-c. In other examples, the TRxP 105-d may beam train with the UE 115-b by transmitting beam swept synchronization signals. The beam swept synchronization signals may be associated with phase shifter combinations for antenna elements of of the antenna panel supported by TRxP 105-d. The beam swept synchronization signals may be configured by a finite-precision codebook $F_2 = \{d_1, \ldots, d_N\}$. The UE 115-b may receive the beam swept synchronization signals of the TRxPs 105 and train one or more receive beams according to a configured codebook $G = \{e_1, \ldots e_P\}$.

Based on the beam trainings, the UE 115-b may select multiple beams pairs associated with the TRxPs 105-c and 105-d, and receive beams at the UE 115-b. The UE 115-b may determine the beam pairs according to the beam indices associated with the beam trainings. For example, the UE 115-b may determine a best beam pair and a second best beam pair for both the first TRxP 105-c and the second TRxP 105-d. The UE 115-b may measure the received signal levels (e.g., gain or reference signal received power (RSRP) levels) for the selected beam pairs.

At 310, the UE 115-b may then determine co-phasing factors (e.g., co-phasing factors or co-phasing correction factors) for each of the TRxPs 105-c and 105-d based on the selected beam pairs and measured RSRP values. The co-phasing factor determination may be part of an effective channel and receive beam estimate for signaling reception on the corresponding channels $H_1$ and $H_2$. The co-phasing factors may correspond to modulo quantization constraints. The determined co-phasing factors may be directed to antenna elements of a single antenna panel for each of the respective TRxPs 105-c and 105-d. Determining the one or more co-phasing factors at UE 115-b may include correlating (e.g., a plurality of correlations) the complex signal/symbol estimates to obtain the co-phasing factors.

At 315, the UE 115-b may transmit individual feedback messages to the TRxPs 105-c and 105-d. For example, the feedback for TRxP 105-c may include the selected beam pairs corresponding to the TRxP 105-c, the measured RSRP values of the beam pairs, and the determined co-phasing factors of the selected beam pairs. In other examples, the feedback for TRxP 105-d may include the selected beam pairs corresponding to the TRxP 105-d, the measured RSRP values, as well as the determined co-phasing factors.

At 320, TRxP 105-c may process the received feedback information and process the included beam pair indices, RSRP values, and co-phasing factors. Based on the processing, the TRxP 105-c may generate beam weights for determining a combined beam $f_1$. The combined beam may co-phasing antenna elements included in an antenna panel supported at the TRxP 105-c. Similarly, at 325, TRxP 105-d may process the received feedback information and process the included beam pair indices, RSRP values, and co-phasing factors. Based on the processing, the TRxP 105-d may generate beam weights for determining a combined beam $f_2$. The combined beam may co-phasing antenna elements included in an antenna panel supported at the TRxP 105-d.

Figure 4:
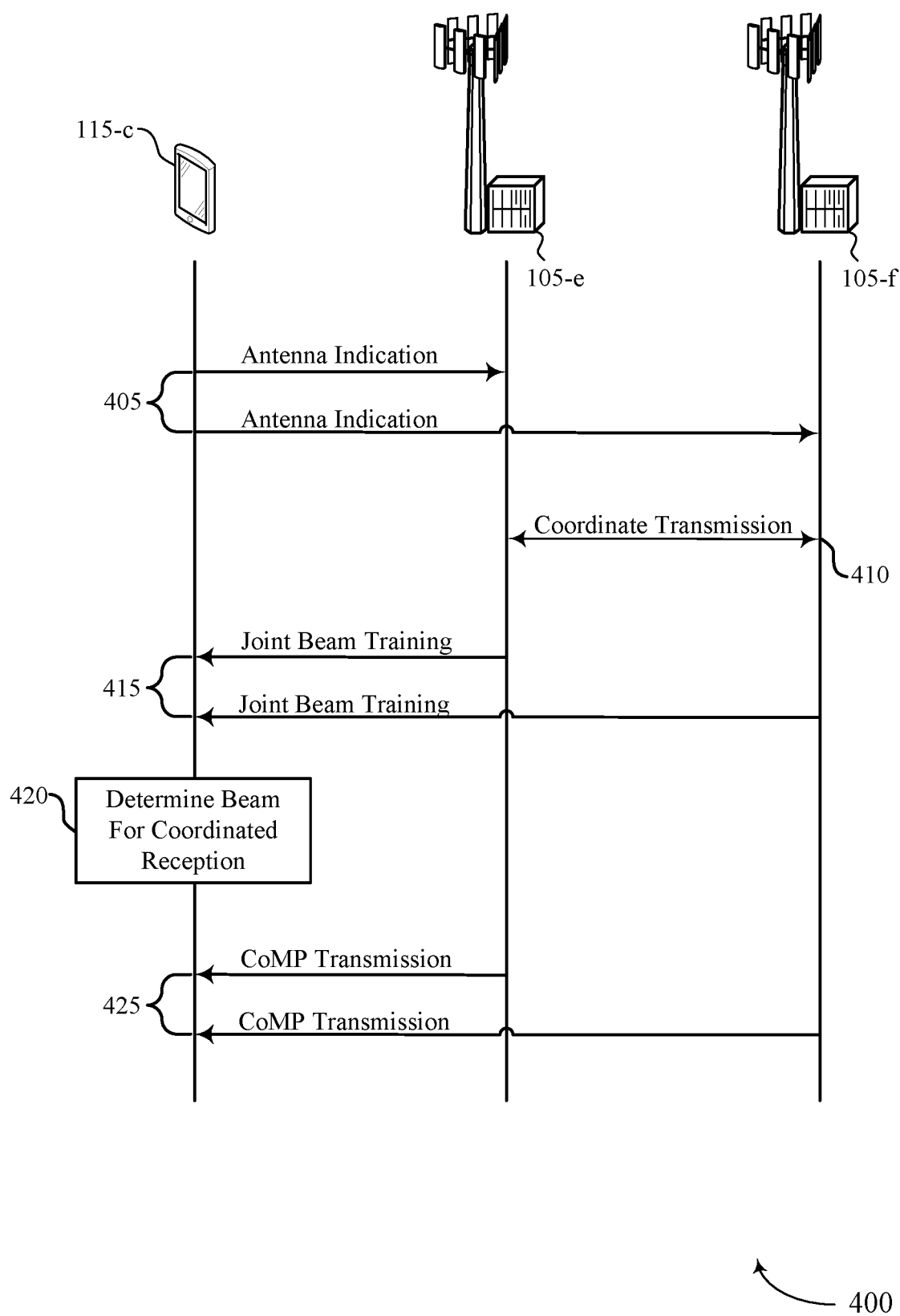
FIG. 4 illustrates an example of a process flow that supports techniques for coordinated beamforming in millimeter wave systems in accordance with aspects of the present disclosure.

FIG. 4 illustrates an example of a process flow 400 that supports techniques for coordinated beamforming in millimeter wave systems in accordance with aspects of the present disclosure. The process flow 400 may include a UE 115-c, a base station 105-e, and a base station 105-f, which may be examples of the corresponding devices described with reference to FIGS. 1 through 3. As described herein, the operations of process flow 400 may include methods that follow the described methods with reference to FIG. 3. As described herein, the base station 105-e and the base station 105-f may be referred to herein as TRxPs. The described communications devices may implement one or more methods for coordinated beam training and CoMP transmission directed to the UE 115-c. Alternative examples of the following may be implemented, where some steps may be performed in a different order than described or not performed at all. In some examples, steps may include additional features not mentioned below, or further steps may be added.

At 405, the UE 115-c may transmit an antenna indication to the TRxP 105-e and the TRxP 105-f. The indication may include a number of supported antennas N (i.e., within an antenna subarray) at the UE 115-c. At 410, the TRxP 105-e and the TRxP 105-f may communicate via a supported backhaul link to coordinate potential coordinated beam training with the UE 115-c.

Based on the coordination, at 415, the TRxP 105-e and the TRxP 105-f may perform coordinated (e.g., joint) beam training with the UE 115-c. The coordinated beam training may include jointly transmitting reference signal indications over the determined combined beams $f_1$ and $f_2$, respectively. The combined beams $f_1$ and $f_2$ may share a modulation (e.g., quadrate amplitude modulation (QAM)) symbol. The TRxPs 105-e and 105-f may perform the coordinated beam training over consecutive time and frequency resources (e.g., channel state information reference signal (CSI-RS) resources) of the channels $H_1$ and $H_2$. The size of the consecutive time and frequency resources may be based on the indicated number of supported antennas (e.g., N) at the UE 115-c.

At 420, the UE 115-c may receive the coordinated beam training transmissions of TRxPs 105-e and 105-f and estimate a vector channel for reception. The estimation may be according to one or more time samplings within the consecutive time and frequency resources of the joint beam training. The estimation may be based on the reference signal reception associated with the coordinated beam training over the combined beams $f_1$ and $f_2$ Based on the estimation, the UE 115-c may determine a normalization of the estimated effective channel h for reception at the supported antennas. The normalized effective channel g (e.g., $h/\|h\|$) may correspond to the unit-norm combining beam (e.g., also referred to as the matched filtering beam).

At 425, the UE 115-c may receive a coordinated beamformed transmission from the TRxP 105-e and the TRxP 105-f on the combined beams $f_1$ and $f_2$. The coordinated beamformed transmission may be received on the determined match filtering beam g. As described herein, the coordinated beamformed transmission may correspond to a CoMP transmission by the TRxP 105-e and the TRxP 105-f. The coordinated beamformed transmission may be received simultaneously (or near simultaneously) from the TRxP 105-e and the TRxP 105-f. The coordinated beamformed transmission may be a same (e.g., shared, for example, same information bits) signal from the TRxP 105-e and the TRxP 105-f.

Figure 5:
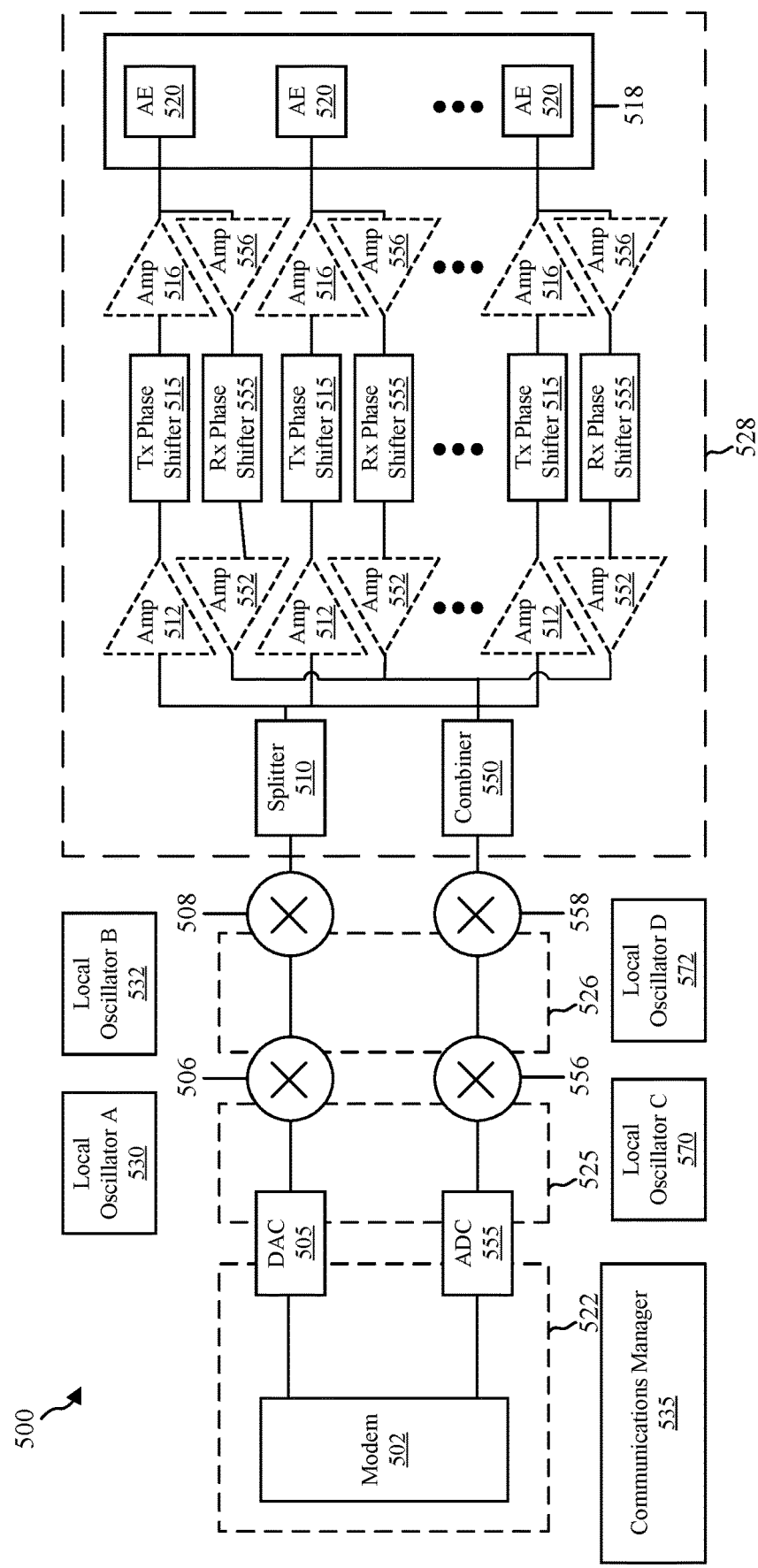
FIG. 5 illustrates an example of an architecture that supports techniques for coordinated beamforming in millimeter wave systems in accordance with aspects of the present disclosure.

FIG. 5 illustrates an example of an architecture 500 that supports techniques for coordinated beamforming in millimeter wave systems in accordance with aspects of the present disclosure. In some examples, architecture 500 may implement aspects of wireless communications 100 or 200, as described with reference to FIGS. 1 and 2. In some examples, architecture 500 may be an example of a transmitting device (e.g., a TRxP) or a receiving device (e.g., a UE), as described herein.

Broadly, FIG. 5 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 500 includes a modem (modulator/demodulator) 502, a digital to analog converter (DAC) 505, a first mixer 506, a second mixer 508, and a splitter 510. The architecture 500 also includes a plurality of first amplifiers 512, a plurality of phase shifters 515, a plurality of second amplifiers 516, and an antenna array 518 that includes a plurality of antenna elements 520. Transmission lines or other waveguides, wires, traces, or the like are shown connecting the various components to illustrate how signals to be transmitted may travel between components. Boxes 522, 525, 526, and 528 indicate regions in the architecture 500 in which different types of signals travel or are processed. Specifically, box 522 indicates a region in which digital baseband signals travel or are processed, box 525 indicates a region in which analog baseband signals travel or are processed, box 526 indicates a region in which analog intermediate frequency (IF) signals travel or are processed, and box 528 indicates a region in which analog radio frequency (RF) signals travel or are processed. The architecture also includes a local oscillator A 530, a local oscillator B 532, and a communications manager 535.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 505, first and second mixers 506, 508, splitter 510, first amplifiers 512, phase shifters 515, and/or the second amplifiers 516 to transmit signals via one or more or all of the antenna elements 520. The modem 502 may process signals and control operation in accordance with a communication standard such as a wireless standard discussed herein. The DAC 505 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases some processing or filtering (not shown) may take place at the IF. The second mixer 508 upconverts the analog IF signals to analog RF signals using the local oscillator B 532. Similarly to the first mixer, the second mixer 508 may mix the signals with an oscillating signal generated by the local oscillator B 532 to "move" the IF analog signals to the RF, or the frequency at which signals will be transmitted or received. The modem 502 and/or the communications manager 535 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into a plurality of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 515, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 515 corresponding to an antenna element 520. The first and second amplifiers 512, 516 are illustrated with dashed lines because one or both of them might not be necessary in some implementations. In one implementation, both the first amplifier 512 and second amplifier 515 are present. In another, neither the first amplifier 512 nor the second amplifier 515 is present. In other implementations, one of the two amplifiers 512, 515 is present but not the other. By way of example, if the splitter 510 is an active splitter, the first amplifier 512 may not be used. By way of further example, if the phase shifter 515 is an active phase shifter that can provide a gain, the second amplifier 516 might not be used. The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or communications manager 535) to provide independent control of the gain for each antenna element 520. For example, the modem 502 and/or the communications manager 535 may have at least one control line connected to each of the splitter 510, first amplifiers 512, phase shifters 515, and/or second amplifiers 516 which may be used to configure a gain to provide a desired amount of gain for each component and thus each antenna element 520.

The phase shifter 515 may provide a configurable phase shift or phase offset to a corresponding RF signal to be transmitted. The phase shifter 515 could be a passive phase shifter not directly connected to a power supply. Passive phase shifters might introduce some insertion loss. The second amplifier 516 could boost the signal to compensate for the insertion loss. The phase shifter 515 could be an active phase shifter connected to a power supply such that the active phase shifter provides some amount of gain or prevents insertion loss. The settings of each of the phase shifters 515 are independent meaning that each can be set to provide a desired amount of phase shift or the same amount of phase shift or some other configuration. The modem 502 and/or the communications manager 535 may have at least one control line connected to each of the phase shifters 515 and which may be used to configure the phase shifters 515 to provide a desired amounts of phase shift or phase offset between antenna elements 520.

In the illustrated architecture 500, RF signals received by the antenna elements 520 are provided to one or more of first amplifier 556 to boost the signal strength. The first amplifier 556 may be connected to the same antenna arrays 518, e.g., for TDD operations. The first amplifier 556 may be connected to different antenna arrays 518. The boosted RF signal is input into one or more of phase shifter 555 to provide a configurable phase shift or phase offset for the corresponding received RF signal. The phase shifter 555 may be an active phase shifter or a passive phase shifter. The settings of the phase shifters 555 are independent, meaning that each can be set to provide a desired amount of phase shift or the same amount of phase shift or some other configuration. The modem 502 and/or the communications manager 535 may have at least one control line connected to each of the phase shifters 555 and which may be used to configure the phase sifters 555 to provide a desired amount of phase shift or phase offset between antenna elements 520.

The outputs of the phase shifters 555 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signal input to combiner 550 have the same magnitude. The amplifiers 552 and/or 556 are illustrated in dashed lines because they might not be necessary in some implementations. In one implementation, both the amplifier 552 and the amplifier 556 are present. In another, neither the amplifier 552 nor the amplifier 556 are present. In other implementations, one of the amplifiers 552, 556 is present but not the other.

In the illustrated architecture 500, signals output by the phase shifters 555 (via the amplifiers 552 when present) are combined in combiner 550. The combiner 550 in architecture combines the RF signal into a signal, as denoted by its presence in box 528. The combiner 550 may be a passive combiner, e.g., not connected to a power source, which may result in some insertion loss. The combiner 550 may be an active combiner, e.g., connected to a power source, which may result in some signal gain. When combiner 550 is an active combiner, it may provide a different (e.g., configurable) amount of gain for each input signal so that the input signals have the same magnitude when they are combined. When combiner 550 is an active combiner, it may not need the second amplifier 552 because the active combiner may provide the signal amplification.

The output of the combiner 550 is input into mixers 558 and 556. Mixers 558 and 556 generally down convert the received RF signal using inputs from local oscillators 572 and 570, respectively, to create intermediate or baseband signals that carry the encoded and modulated information. The output of the mixers 558 and 556 are input into an analog-to-digital converter (ADC) 555 for conversion to analog signals. The analog signals output from ADC 555 is input to modem 502 for baseband processing, e.g., decoding, de-interleaving, etc.

The architecture 500 is given by way of example only to illustrate an architecture for transmitting and/or receiving signals. It will be understood that the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although only a single antenna array 518 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 522, 525, 526, 528) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 510, amplifiers 512, 516, or phase shifters 515 may be located between the DAC 505 and the first mixer 506 or between the first mixer 506 and the second mixer 508. In one example, the functions of one or more of the components may be combined into one component. For example, the phase shifters 515 may perform amplification to include or replace the first and/or or second amplifiers 512, 516. By way of another example, a phase shift may be implemented by the second mixer 508 to obviate the need for a separate phase shifter 515. This technique is sometimes called local oscillator (LO) phase shifting. In one implementation of this configuration, there may be a plurality of IF to RF mixers (e.g., for each antenna element chain) within the second mixer 508 and the local oscillator B 532 would supply different local oscillator signals (with different phase offsets) to each IF to RF mixer.

The modem 502 and/or the communications manager 535 may control one or more of the other components 505-572 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 515 and amplitudes imparted by the amplifiers 512, 516 of the plurality of signals relative to each other.

The communications manager 535 may, when architecture 500 is configured as a receiving device, transmit a first beam measurement report to a first wireless device, the first beam measurement report indicating a first set of beam measurements for a wireless channel between the first wireless device and the second wireless device. The communications manager 535 may receive from the first wireless device a cluster validity metric for at least one beam in the first beam measurement report. The communications manager 535 may transmit to the first wireless device a second beam measurement report based at least in part on the cluster validity metric, the second beam measurement report indicating a second set of beam measurements for the wireless channel, as discussed herein. The communications manager 535 may, when architecture 500 is configured as a transmitting device, receive a first beam measurement report from a second wireless device, the first beam measurement report indicating a first set of beam measurements for a wireless channel between the first wireless device and the second wireless device. The communications manager 535 may transmit to the second wireless device a cluster validity metric for at least one beam in the first beam measurement report. The communications manager 535 may receive from the second wireless device, in response to transmitting the cluster validity metric, a second beam measurement report indicating a second set of beam measurements for the wireless channel. The communications manager 535 may select a beam for transmitting to the second wireless device based at least in part on the first and second beam measurement reports, as discussed herein. The communications manager 535 may be located partially or fully within one or more other components of the architecture 500. For example, the communications manager 535 may be located within the modem 502 in at least one implementation.

Figure 6:
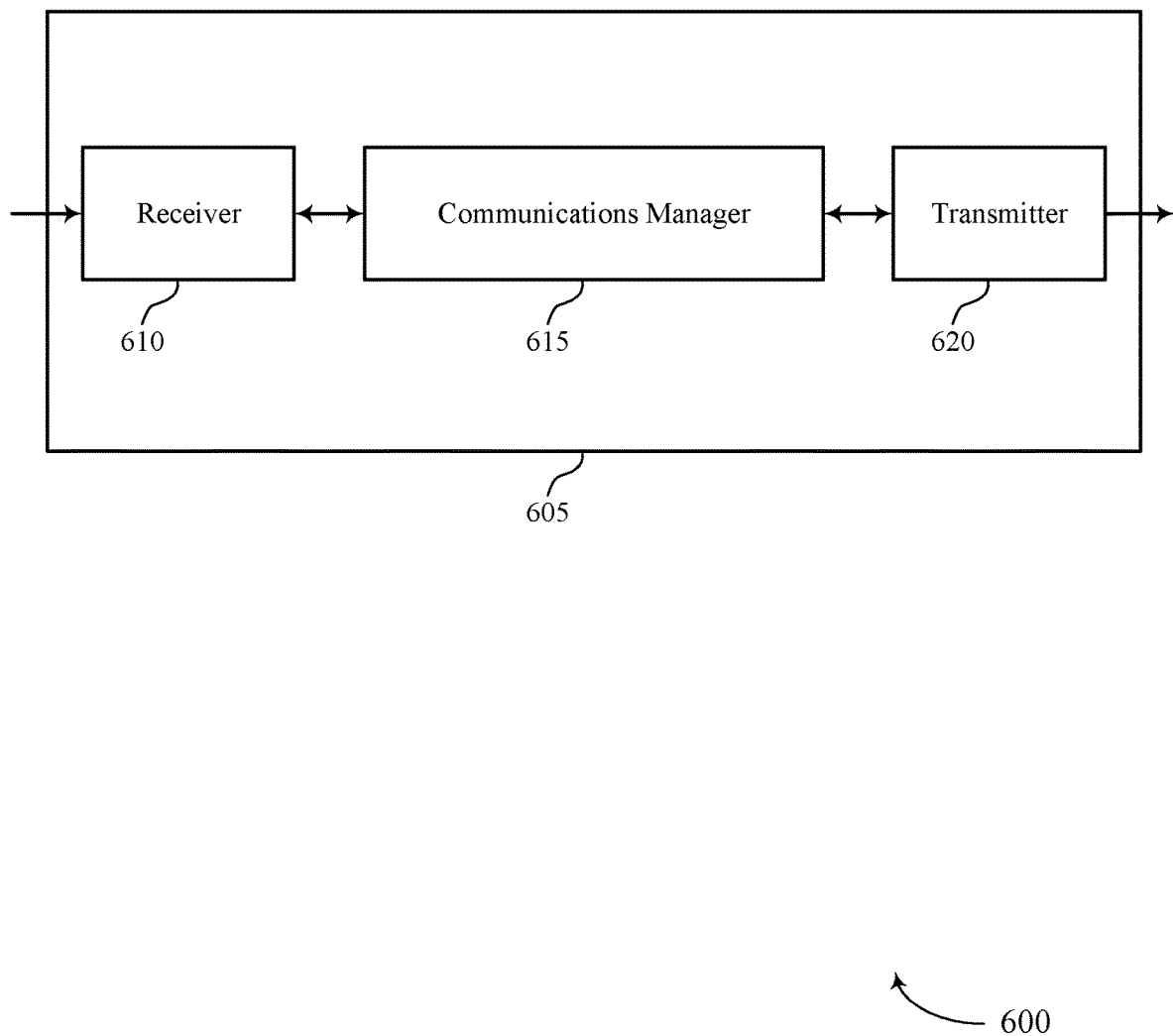
FIGS. 6 and 7 show block diagrams of devices that support techniques for coordinated beamforming in millimeter wave systems in accordance with aspects of the present disclosure.

FIG. 6 shows a block diagram 600 of a device 605 that supports techniques for coordinated beamforming in millimeter wave systems in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for coordinated beamforming in millimeter wave systems, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, to a set of transmission-reception points, an indication of a number of supported antennas at the UE for signal reception, transmit a request for a coordinated beam training by the set of transmission-reception points over a set of resources, the set of resources based on the number of supported antennas at the UE, determine, based on the coordinated beam training, a set of beam weights for coordinated reception at the supported antennas of the UE, and receive, based on the determining, a coordinated beamformed transmission from the set of transmission-reception points. The communications manager 615 may be an example of aspects of the communications manager 805 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
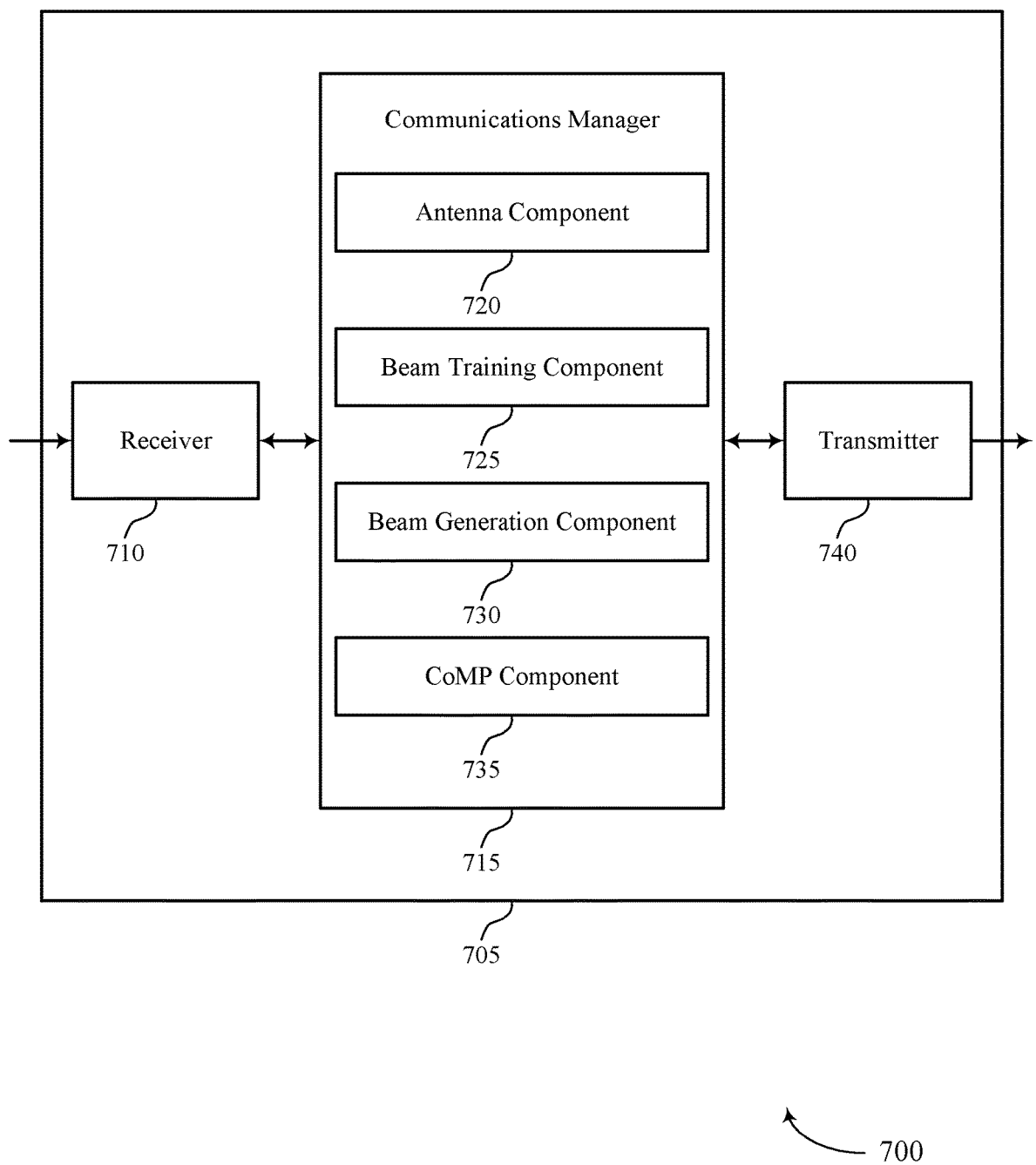

FIG. 7 shows a block diagram 700 of a device 705 that supports techniques for coordinated beamforming in millimeter wave systems in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to techniques for coordinated beamforming in millimeter wave systems, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an antenna component 720, a beam training component 725, a beam generation component 730, and a CoMP component 735. The communications manager 715 may be an example of aspects of the communications manager 805 described herein.

The antenna component 720 may transmit, to a set of transmission-reception points, an indication of a number of supported antennas at the UE for signal reception.

The beam training component 725 may transmit a request for a coordinated beam training by the set of transmission-reception points over a set of resources, the set of resources based on the number of supported antennas at the UE.

The beam generation component 730 may determine, based on the coordinated beam training, a set of beam weights for coordinated reception at the supported antennas of the UE.

The CoMP component 735 may receive, based on the determining, a coordinated beamformed transmission from the set of transmission-reception points.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
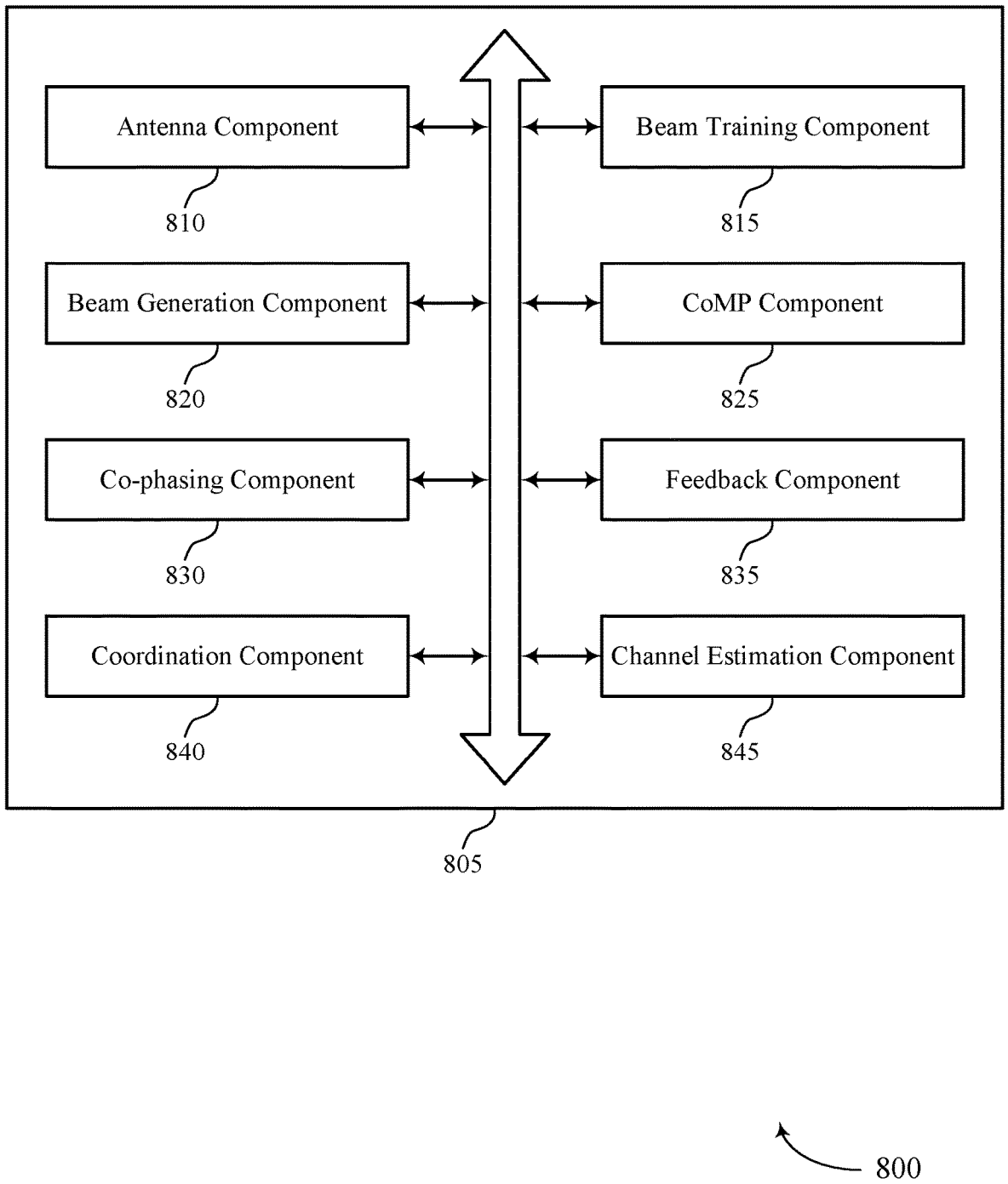
FIG. 8 shows a block diagram of a communications manager that supports techniques for coordinated beamforming in millimeter wave systems in accordance with aspects of the present disclosure.

FIG. 8 shows a block diagram 800 of a communications manager 805 that supports techniques for coordinated beamforming in millimeter wave systems in accordance with aspects of the present disclosure. The communications manager 805 may be an example of aspects of a communications manager 615 or a communications manager 715 described herein. The communications manager 805 may include an antenna component 810, a beam training component 815, a beam generation component 820, a CoMP component 825, a co-phasing component 830, a feedback component 835, a coordination component 840, and a channel estimation component 845. Each of these modules may communicate, directly or indirectly, with one another (e.g., via one or more buses).

The antenna component 810 may transmit, to a set of transmission-reception points, an indication of a number of supported antennas at the UE for signal reception.

In some examples, the antenna component 810 may select a subarray of antennas from a set of supported subarrays of antennas at the UE. In some examples, the antenna component 810 may determine the coordinated beam training based on the selecting.

The beam training component 815 may transmit a request for a coordinated beam training by the set of transmission-reception points over a set of resources, the set of resources based on the number of supported antennas at the UE.

In some examples, the beam training component 815 may receive beam swept synchronization signals from the transmission-reception point. In some examples, the beam training component 815 may select, based on the receiving, a first set of beams for non-coordinated transmissions by the transmission-reception point and a second set of beams for reception at the UE. In some examples, the beam training component 815 may determine a signal strength for a set of beam pairs, each beam pair of the set of beam pairs including a beam of the first set of beams and a beam of the second set of beams.

In some examples, the beam training component 815 may correlate symbol estimates for each beam pair of the set of beam pairs. In some examples, the beam training component 815 may determine the set of co-phasing factors within the antenna panel based on the correlating. In some examples, the beam training component 815 may determine a set of beam weights at the UE based on the coordinated beam training. In some examples, the beam training component 815 may where determine the beam for coordinated reception based on determining the set of beam weights.

The beam generation component 820 may determine, based on the coordinated beam training, a set of beam weights for coordinated reception at the supported antennas of the UE.

The CoMP component 825 may receive, based on the determining, a coordinated beamformed transmission from the set of transmission-reception points.

In some examples, the CoMP component 825 may simultaneously receive the same information bits from each transmission-reception point of the set of transmission-reception points. In some examples, the set of resources includes contiguous channel state information reference signal resources. In some examples, the coordinated beamformed transmission is part of a coordinated multipoint transmission by the set of transmission-reception points.

The co-phasing component 830 may determine, for a transmission-reception point of the set of transmission-reception points, a set of co-phasing factors within an antenna panel.

In some examples, the set of co-phasing factors within the antenna panel are associated with distinct clusters of a channel, the channel supporting communication between the transmission-reception point and the UE.

The feedback component 835 may transmit, to the transmission-reception point, an indication of the first set of beams, the signal strength for the set of beam pairs, and the set of co-phasing factors within the antenna panel.

The coordination component 840 may receive a reference signal transmission from each transmission-reception point of the set of transmission-reception points as part of the coordinated beam training, the reference signal transmission from each transmission-reception point sharing a common modulation symbol.

The channel estimation component 845 may estimate an effective channel for the number of supported antennas at the UE.

In some examples, the channel estimation component 845 may determine the beam weights for coordinated reception at the UE is based on the estimating. In some examples, the channel estimation component 845 may determine, as part of a per-antenna sampling, a received signal estimate for an antenna of the number of supported antennas at the UE with a distinct time-sample of the set of resources. In some examples, the channel estimation component 845 may determine, as part of a unitary matrix sampling, a received signal estimate for the number of supported antennas at the UE with a distinct time-sample of the set of resources.

Figure 9:
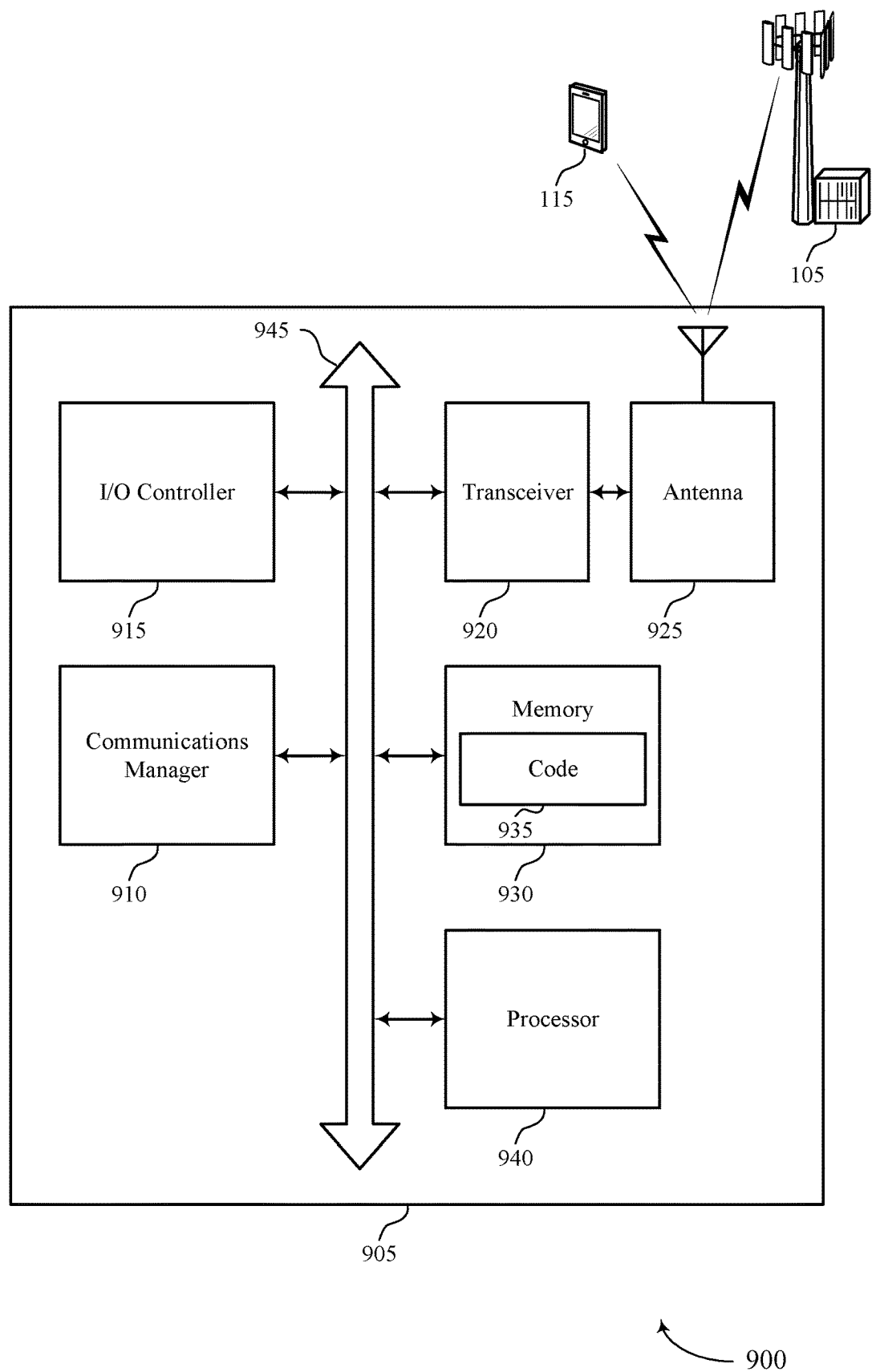
FIG. 9 shows a diagram of a system including a device that supports techniques for coordinated beamforming in millimeter wave systems in accordance with aspects of the present disclosure.

FIG. 9 shows a diagram of a system 900 including a device 905 that supports techniques for coordinated beamforming in millimeter wave systems in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, to a set of transmission-reception points, an indication of a number of supported antennas at the UE for signal reception, transmit a request for a coordinated beam training by the set of transmission-reception points over a set of resources, the set of resources based on the number of supported antennas at the UE, determine, based on the coordinated beam training, a set of beam weights for coordinated reception at the supported antennas of the UE, and receive, based on the determining, a coordinated beamformed transmission from the set of transmission-reception points.

The I/O controller 915 may manage input and output signals for the device 905. The I/O controller 915 may also manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some examples, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for coordinated beamforming in millimeter wave systems).

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (e.g., when compiled and executed) to perform functions described herein.

Figure 10:
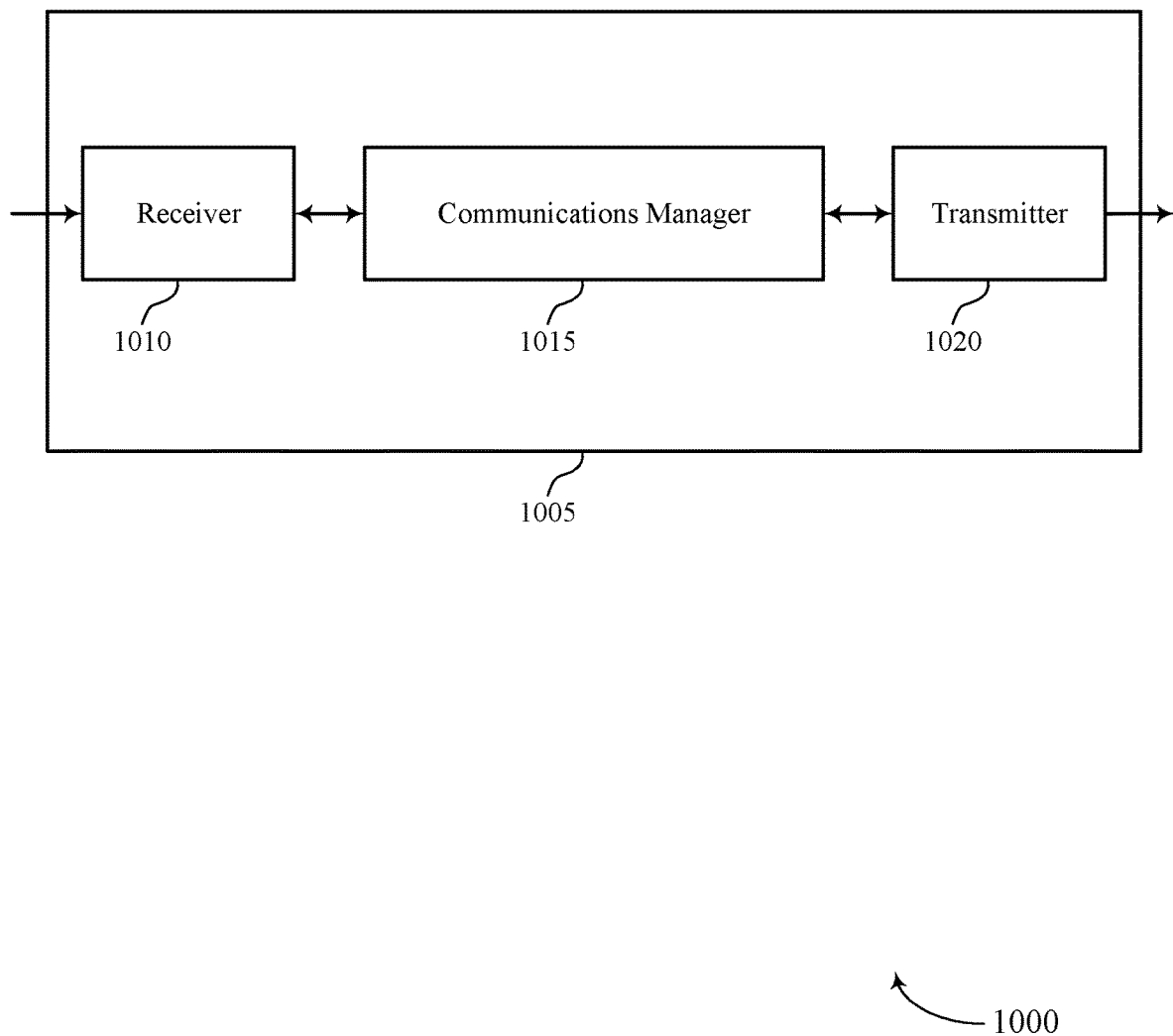
FIGS. 10 and 11 show block diagrams of devices that support techniques for coordinated beamforming in millimeter wave systems in accordance with aspects of the present disclosure.

FIG. 10 shows a block diagram 1000 of a device 1005 that supports techniques for coordinated beamforming in millimeter wave systems in accordance with aspects of the present disclosure. The device 1005 may be an example of aspects of a base station 105, also referred to as a TRxP 105, as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for coordinated beamforming in millimeter wave systems, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive an indication of a number of supported antennas at a UE for signal reception, determine a beam for a coordinated beam training over a set of resources, the set of resources based on the number of supported antennas at the UE, transmit, to the UE, a reference signal over the beam as part of the coordinated beam training with one or more additional transmission-reception points, and transmit, to the UE, a beamformed transmission over the beam, the beamformed transmission coordinated with at least one beamformed transmission of the one or more additional transmission-reception points. The communications manager 1015 may be an example of aspects of the communications manager 1205 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
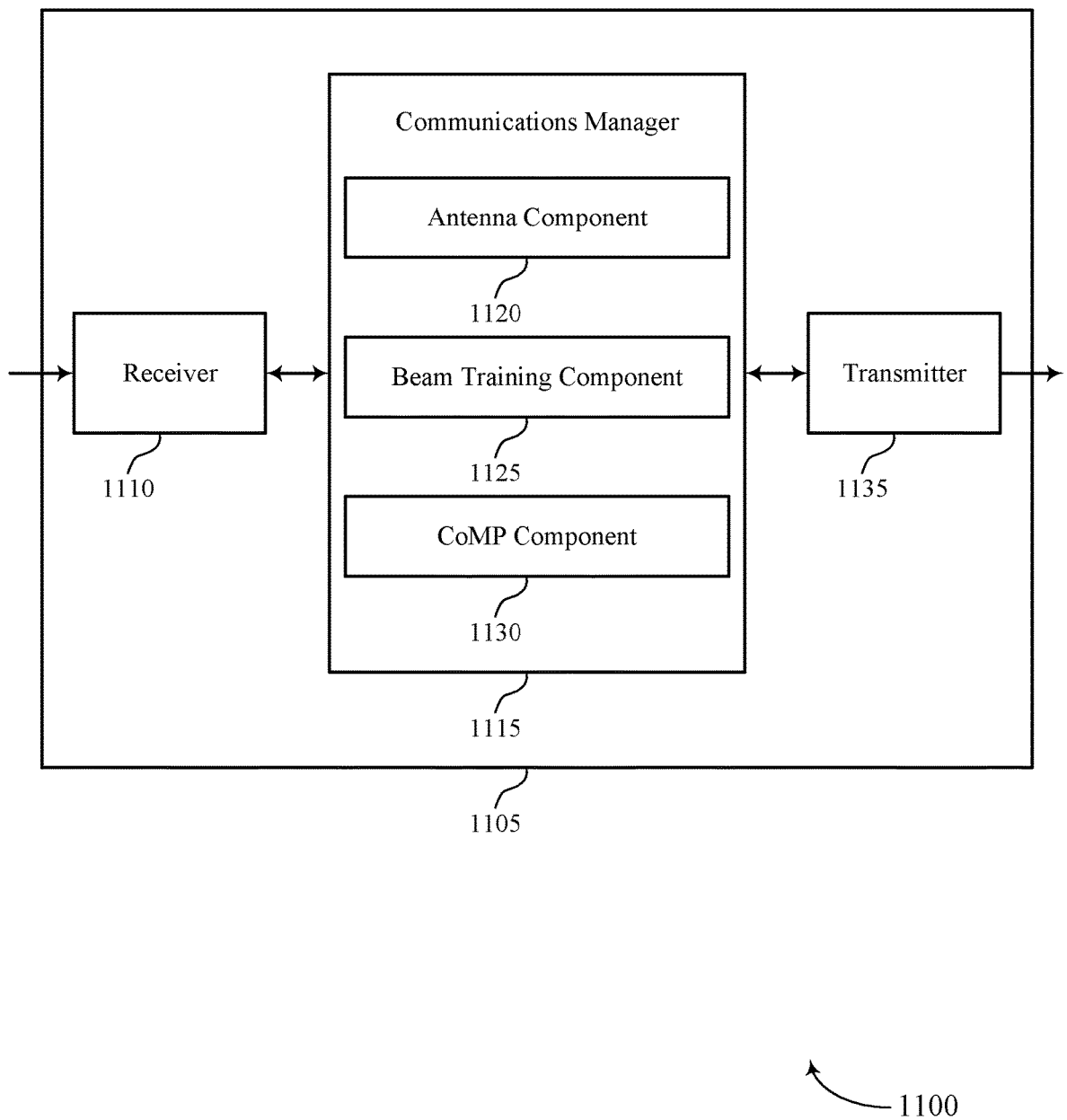

FIG. 11 shows a block diagram 1100 of a device 1105 that supports techniques for coordinated beamforming in millimeter wave systems in accordance with aspects of the present disclosure. The device 1105 may be an example of aspects of a device 1005, or a base station 105, also referred to as a TRxP 105, as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for coordinated beamforming in millimeter wave systems, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 910 as described herein. The communications manager 1115 may include an antenna component 1120, a beam training component 1125, and a CoMP component 1130. The communications manager 1115 may be an example of aspects of the communications manager 1205 described herein.

The antenna component 1120 may receive an indication of a number of supported antennas at a UE for signal reception.

The beam training component 1125 may determine a beam for a coordinated beam training over a set of resources, the set of resources based on the number of supported antennas at the UE and transmit, to the UE, a reference signal over the beam as part of the coordinated beam training with one or more additional transmission-reception points.

The CoMP component 1130 may transmit, to the UE, a beamformed transmission over the beam, the beamformed transmission coordinated with at least one beamformed transmission of the one or more additional transmission-reception points.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
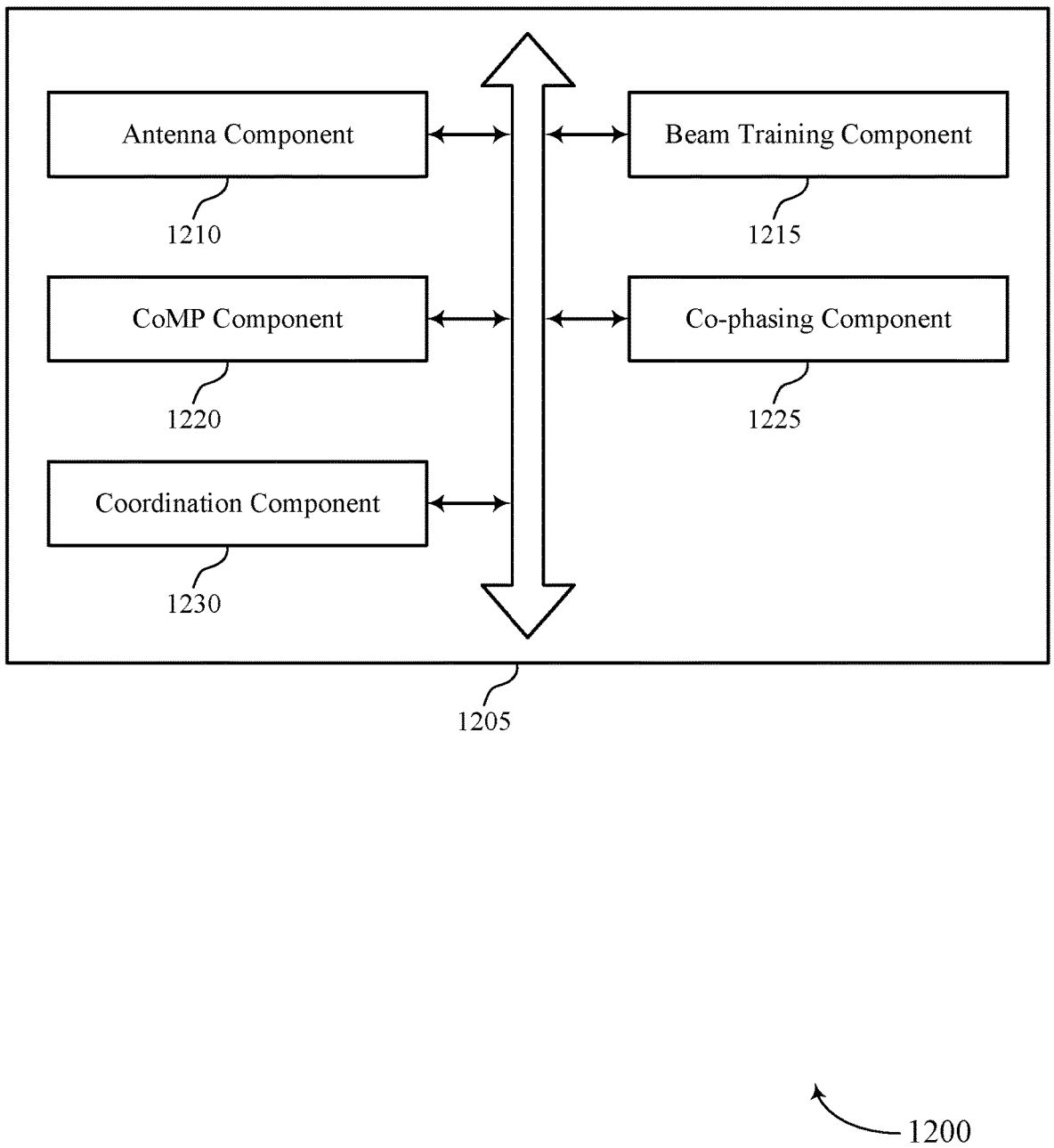
FIG. 12 shows a block diagram of a communications manager that supports techniques for coordinated beamforming in millimeter wave systems in accordance with aspects of the present disclosure.

FIG. 12 shows a block diagram 1200 of a communications manager 1205 that supports techniques for coordinated beamforming in millimeter wave systems in accordance with aspects of the present disclosure. The communications manager 1205 may be an example of aspects of a communications manager 1015 or a communications manager 1115 described herein. The communications manager 1205 may include an antenna component 1210, a beam training component 1215, a CoMP component 1220, a co-phasing component 1225, and a coordination component 1230. Each of these modules may communicate, directly or indirectly, with one another (e.g., via one or more buses).

The antenna component 1210 may receive an indication of a number of supported antennas at a UE for signal reception.

The beam training component 1215 may determine a beam for a coordinated beam training over a set of resources, the set of resources based on the number of supported antennas at the UE.

In some examples, the beam training component 1215 may transmit, to the UE, a reference signal over the beam as part of the coordinated beam training with one or more additional transmission-reception points. In some examples, the beam training component 1215 may transmit beam swept synchronization signals to the UE. In some examples, the beam training component 1215 may identify receiving the indication is based on the transmitting.

In some examples, the beam training component 1215 may receive a request from the UE for the coordinated beam training. In some examples, the beam training component 1215 may determine the beam for the coordinated beam training is based on the receiving.

In some examples, the indication further includes a first set of beams for non-coordinated transmission by the transmission-reception point and a signal strength for a set of beam pairs, each beam pair of the set of beam pairs including a beam of the first set of beams and a beam of a second set of beams for reception at the UE.

The CoMP component 1220 may transmit, to the UE, a beamformed transmission over the beam, the beamformed transmission coordinated with at least one beamformed transmission of the one or more additional transmission-reception points.

In some examples, the CoMP component 1220 may simultaneously transmit the same information bits with the at least one beamformed transmission of the one or more additional transmission-reception points. In some examples, the set of resources includes contiguous channel state information reference signal resources. In some examples, the beamformed transmission is part of a coordinated multipoint transmission by the transmission-reception point and the one or more additional transmission-reception points.

The co-phasing component 1225 may receive, from the UE, an indication including a set of co-phasing factors within an antenna panel at the transmission-reception point.

In some examples, the co-phasing component 1225 may determine a set of beam weights at the transmission-reception point based on the indication. In some examples, the co-phasing component 1225 may determine the beam for the coordinated beam training is based on determining the set of beam weights. In some examples, the set of co-phasing factors within the antenna panel may be associated with distinct clusters of a channel, the channel supporting communication between the transmission-reception point and the UE.

The coordination component 1230 may coordinate with the one or more additional transmission-reception points via a backhaul link.

In some examples, the coordination component 1230 may determine that transmitting the reference signal over the beam as part of the coordinated beam training is based on the coordinating. In some examples, the reference signal shares a common modulation symbol with at least one reference signal transmission of the one or more additional transmission-reception points.

Figure 13:
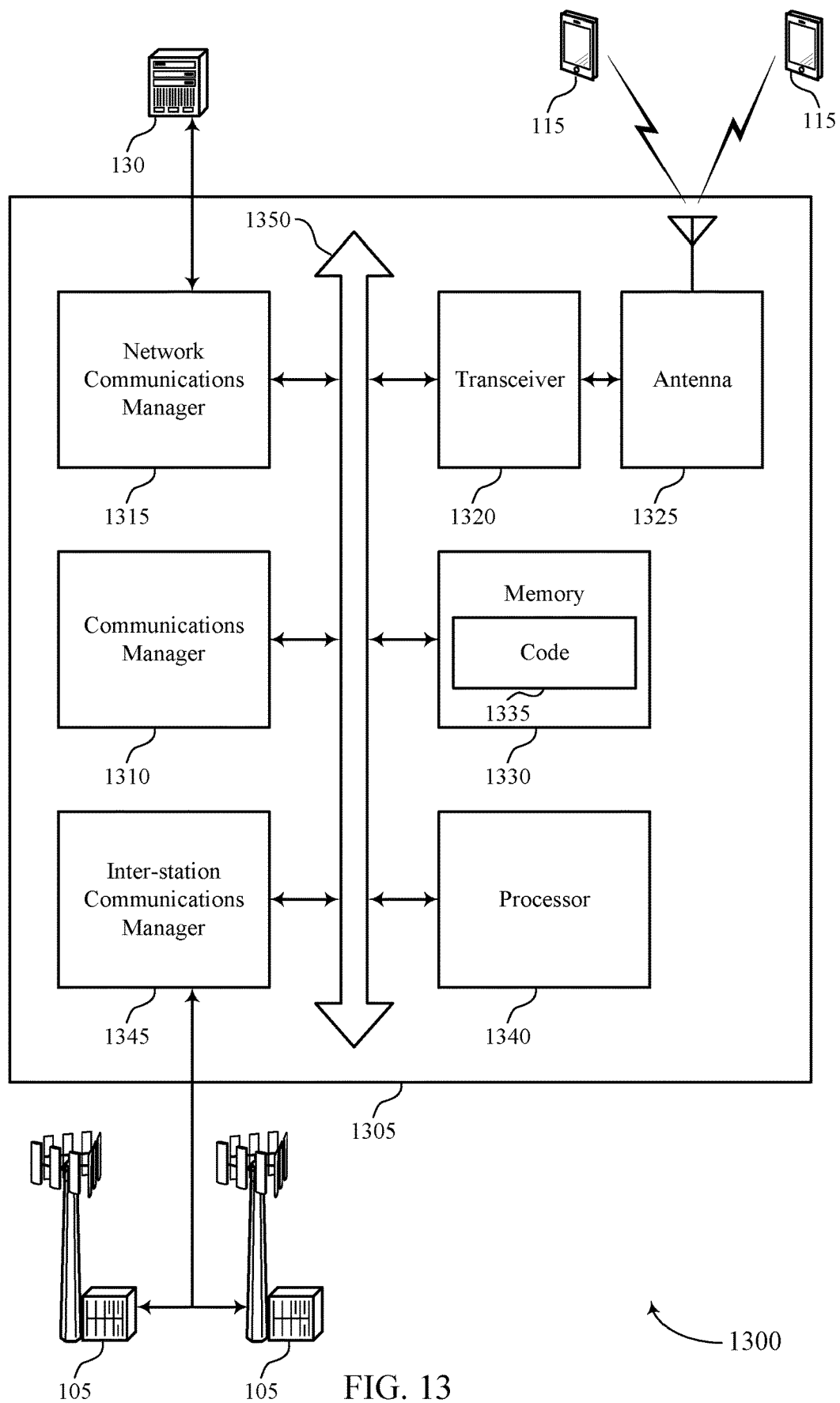
FIG. 13 shows a diagram of a system including a device that supports techniques for coordinated beamforming in millimeter wave systems in accordance with aspects of the present disclosure.

FIG. 13 shows a diagram of a system 1300 including a device 1305 that supports techniques for coordinated beamforming in millimeter wave systems in accordance with aspects of the present disclosure. The device 1305 may be an example of or include the components of device 1005, device 1105, or a base station 105, also referred to as a TRxP 105, as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive an indication of a number of supported antennas at a UE for signal reception, determine a beam for a coordinated beam training over a set of resources, the set of resources based on the number of supported antennas at the UE, transmit, to the UE, a reference signal over the beam as part of the coordinated beam training with one or more additional transmission-reception points, and transmit, to the UE, a beamformed transmission over the beam, the beamformed transmission coordinated with at least one beamformed transmission of the one or more additional transmission-reception points.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some examples, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for coordinated beamforming in millimeter wave systems).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (e.g., when compiled and executed) to perform functions described herein.

Figure 14:
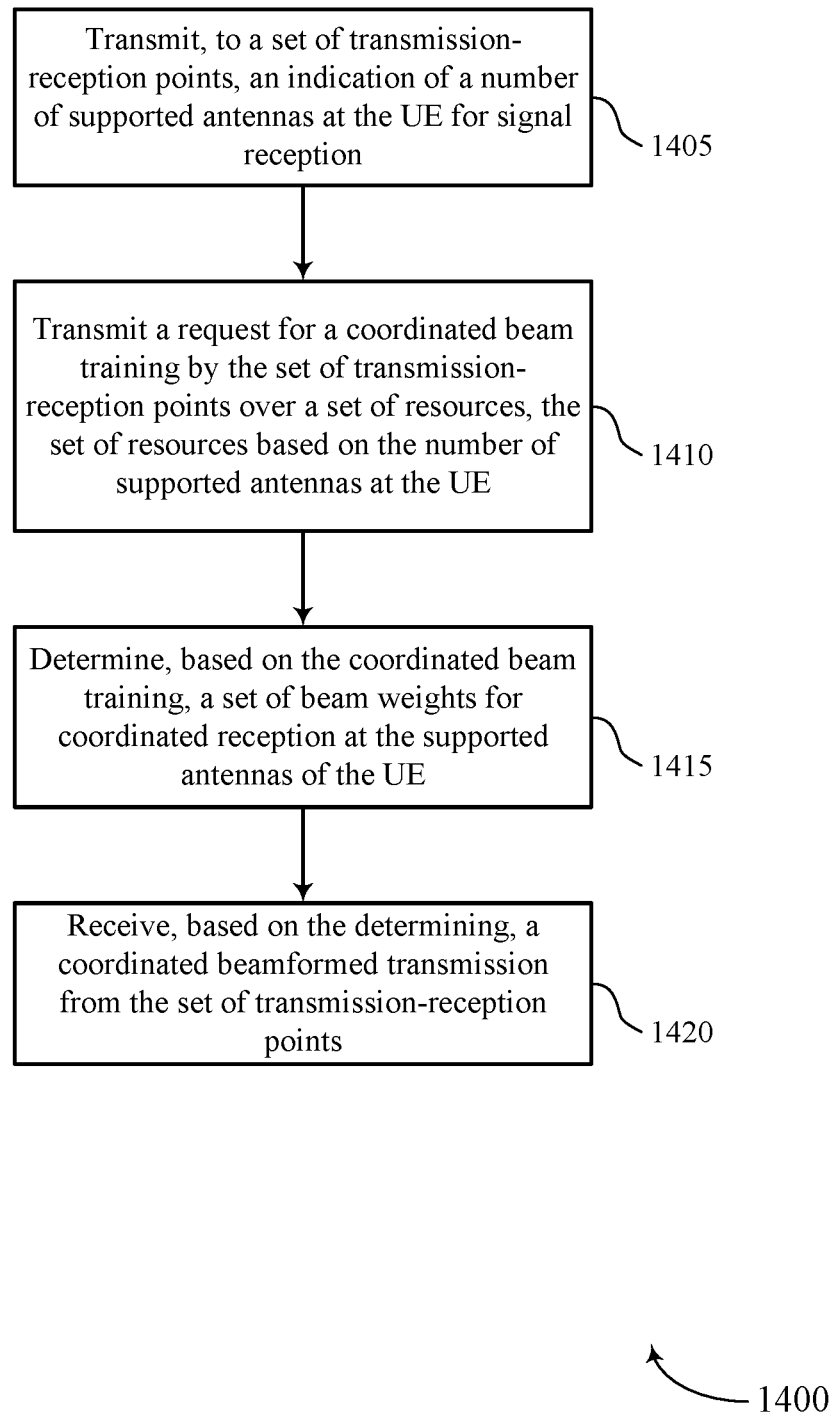
FIGS. 14 through 17 show flowcharts illustrating methods that support techniques for coordinated beamforming in millimeter wave systems in accordance with aspects of the present disclosure.

FIG. 14 shows a flowchart illustrating a method 1400 that supports techniques for coordinated beamforming in millimeter wave systems in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit, to a set of transmission-reception points, an indication of a number of supported antennas at the UE for signal reception. The operations of 1405 may be performed according to the methods described herein. In some examples, aspects of the operations of 1405 may be performed by an antenna component as described with reference to FIGS. 5 through 8.

At 1410, the UE may transmit a request for a coordinated beam training by the set of transmission-reception points over a set of resources, the set of resources based on the number of supported antennas at the UE. The operations of 1410 may be performed according to the methods described herein. In some examples, aspects of the operations of 1410 may be performed by a beam training component as described with reference to FIGS. 5 through 8.

At 1415, the UE may determine, based on the coordinated beam training, a set of beam weights for coordinated reception at the supported antennas of the UE. The operations of 1415 may be performed according to the methods described herein. In some examples, aspects of the operations of 1415 may be performed by a beam generation component as described with reference to FIGS. 5 through 8.

At 1420, the UE may receive, based on the determining, a coordinated beamformed transmission from the set of transmission-reception points. The operations of 1420 may be performed according to the methods described herein. In some examples, aspects of the operations of 1420 may be performed by a CoMP component as described with reference to FIGS. 5 through 8.

Figure 15:
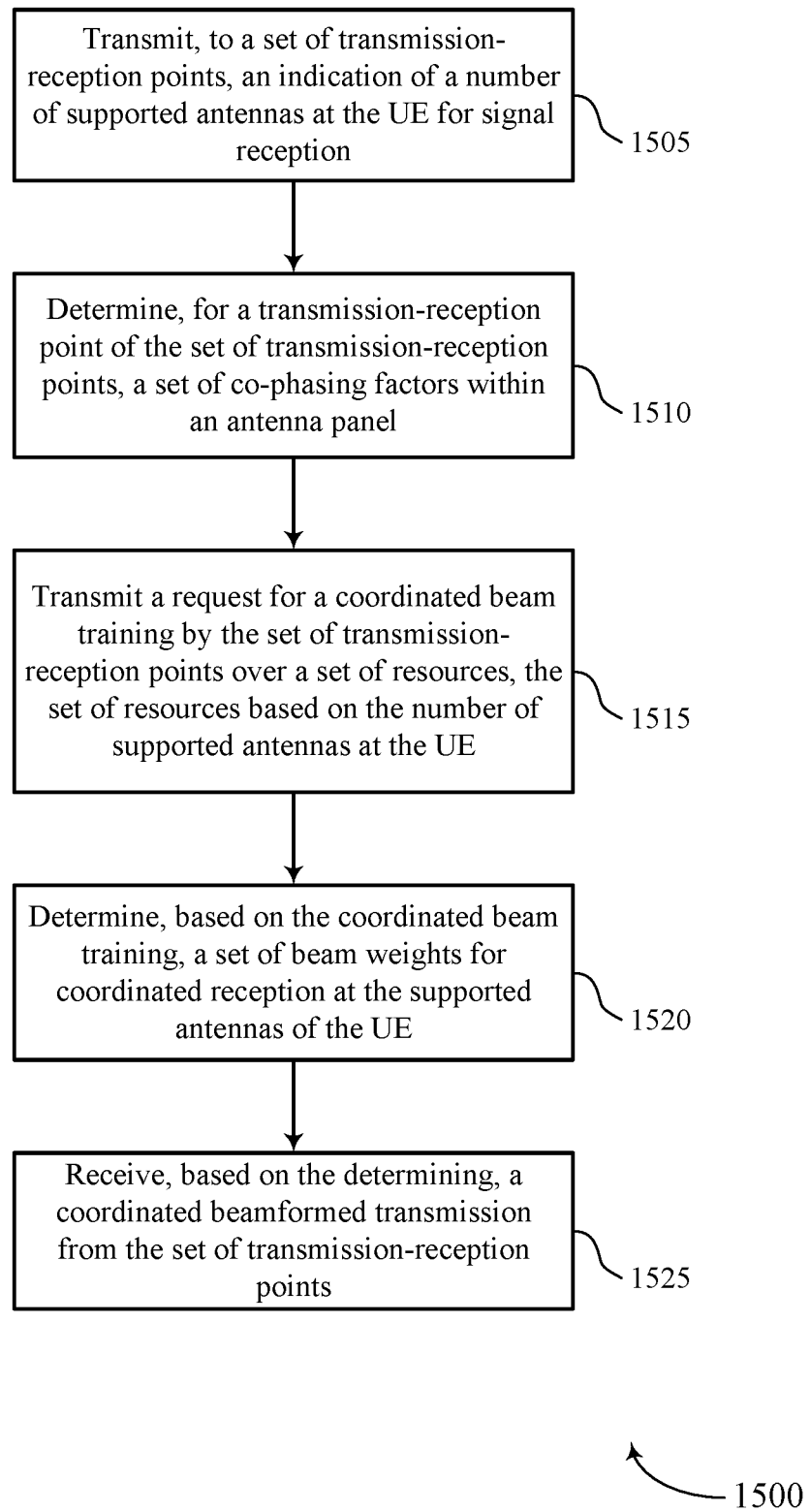

FIG. 15 shows a flowchart illustrating a method 1500 that supports techniques for coordinated beamforming in millimeter wave systems in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a set of transmission-reception points, an indication of a number of supported antennas at the UE for signal reception. The operations of 1505 may be performed according to the methods described herein. In some examples, aspects of the operations of 1505 may be performed by an antenna component as described with reference to FIGS. 5 through 8.

At 1510, the UE may determine, for a transmission-reception point of the set of transmission-reception points, a set of co-phasing factors within an antenna panel. The operations of 1510 may be performed according to the methods described herein. In some examples, aspects of the operations of 1510 may be performed by a co-phasing component as described with reference to FIGS. 5 through 8.

At 1515, the UE may transmit a request for a coordinated beam training by the set of transmission-reception points over a set of resources, the set of resources based on the number of supported antennas at the UE. The operations of 1515 may be performed according to the methods described herein. In some examples, aspects of the operations of 1515 may be performed by a beam training component as described with reference to FIGS. 5 through 8.

At 1520, the UE may determine, based on the coordinated beam training, a set of beam weights for coordinated reception at the supported antennas of the UE. The operations of 1520 may be performed according to the methods described herein. In some examples, aspects of the operations of 1520 may be performed by a beam generation component as described with reference to FIGS. 5 through 8.

At 1525, the UE may receive, based on the determining, a coordinated beamformed transmission from the set of transmission-reception points. The operations of 1525 may be performed according to the methods described herein. In some examples, aspects of the operations of 1525 may be performed by a CoMP component as described with reference to FIGS. 5 through 8.

Figure 16:
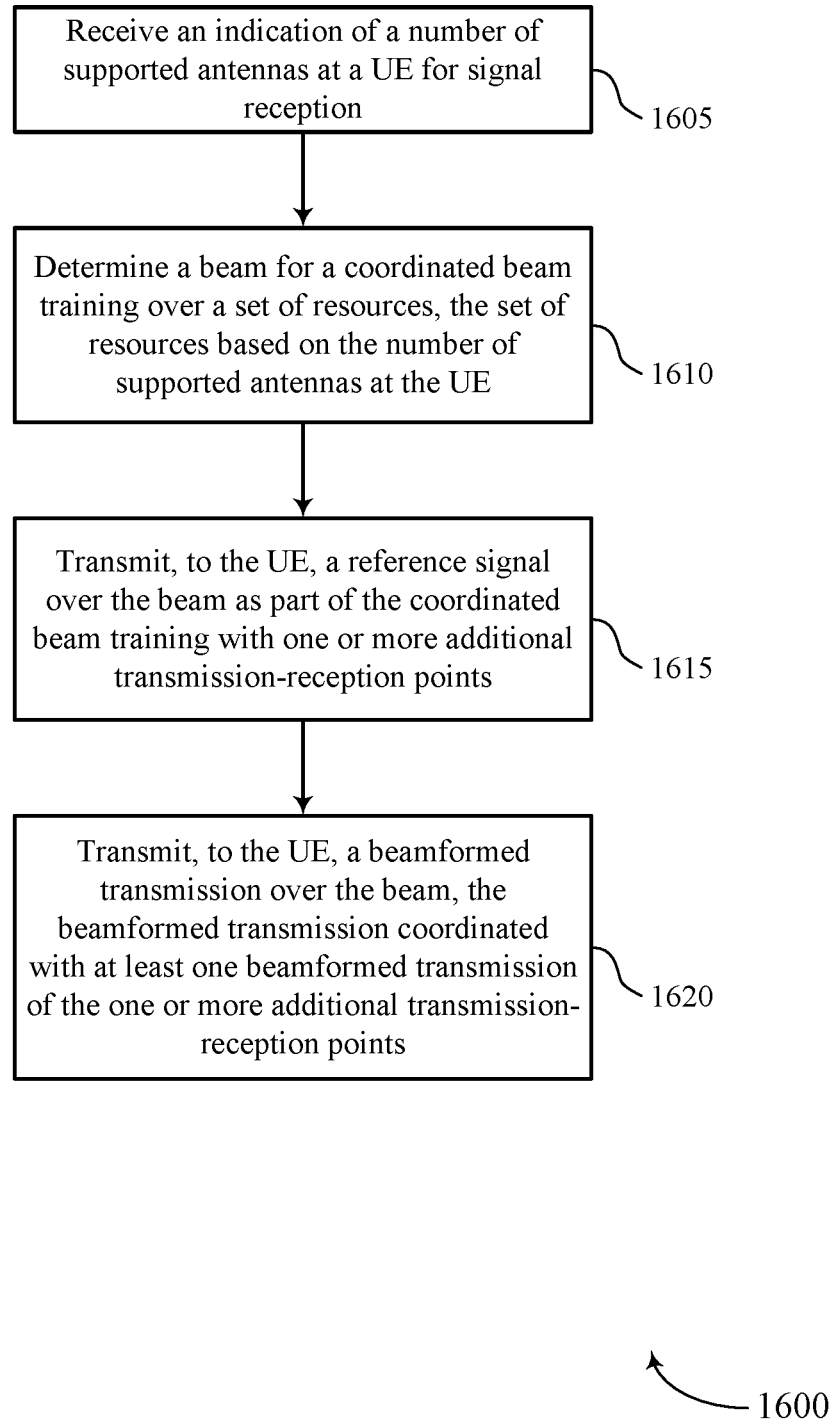

FIG. 16 shows a flowchart illustrating a method 1600 that supports techniques for coordinated beamforming in millimeter wave systems in accordance with aspects of the present disclosure. The operations of method 1600 may be implemented by a base station 105, also referred to as a TRxP 105, or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the TRxP may receive an indication of a number of supported antennas at a UE for signal reception. The operations of 1605 may be performed according to the methods described herein. In some examples, aspects of the operations of 1605 may be performed by an antenna component as described with reference to FIGS. 9 through 12.

At 1610, the TRxP may determine a beam for a coordinated beam training over a set of resources, the set of resources based on the number of supported antennas at the UE. The operations of 1610 may be performed according to the methods described herein. In some examples, aspects of the operations of 1610 may be performed by a beam training component as described with reference to FIGS. 9 through 12.

At 1615, the TRxP may transmit, to the UE, a reference signal over the beam as part of the coordinated beam training with one or more additional transmission-reception points. The operations of 1615 may be performed according to the methods described herein. In some examples, aspects of the operations of 1615 may be performed by a beam training component as described with reference to FIGS. 9 through 12.

At 1620, the TRxP may transmit, to the UE, a beamformed transmission over the beam, the beamformed transmission coordinated with at least one beamformed transmission of the one or more additional transmission-reception points. The operations of 1620 may be performed according to the methods described herein. In some examples, aspects of the operations of 1620 may be performed by a CoMP component as described with reference to FIGS. 9 through 12.

Figure 17:
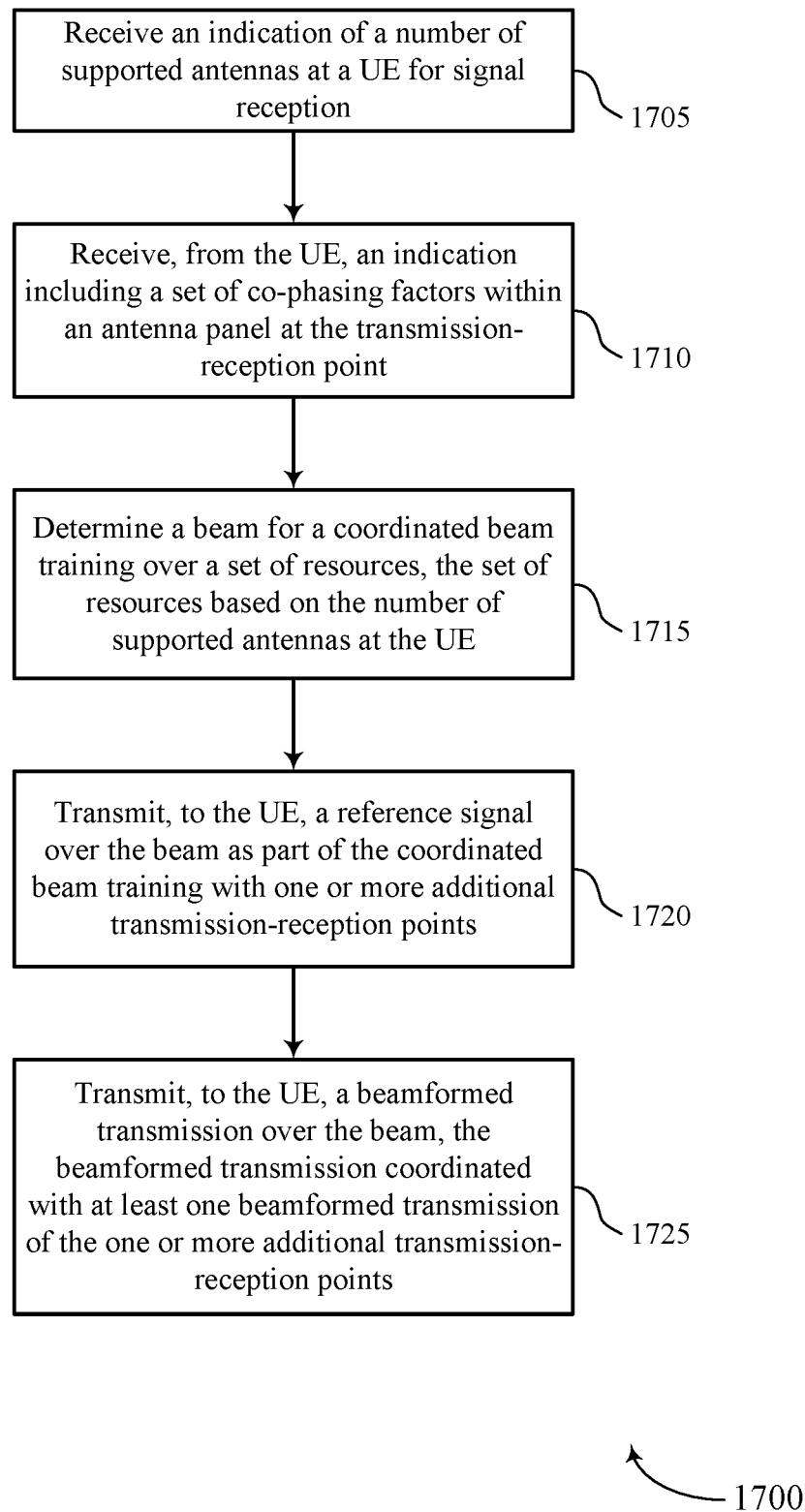

FIG. 17 shows a flowchart illustrating a method 1700 that supports techniques for coordinated beamforming in millimeter wave systems in accordance with aspects of the present disclosure. The operations of method 1700 may be implemented by a base station 105, also referred to as a TRxP 105, or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the TRxP may receive an indication of a number of supported antennas at a UE for signal reception. The operations of 1705 may be performed according to the methods described herein. In some examples, aspects of the operations of 1705 may be performed by an antenna component as described with reference to FIGS. 9 through 12.

At 1710, the TRxP may receive, from the UE, an indication including a set of co-phasing factors within an antenna panel at the transmission-reception point. The operations of 1710 may be performed according to the methods described herein. In some examples, aspects of the operations of 1710 may be performed by a co-phasing component as described with reference to FIGS. 9 through 12.

At 1715, the TRxP may determine a beam for a coordinated beam training over a set of resources, the set of resources based on the number of supported antennas at the UE. The operations of 1715 may be performed according to the methods described herein. In some examples, aspects of the operations of 1715 may be performed by a beam training component as described with reference to FIGS. 9 through 12.

At 1720, the TRxP may transmit, to the UE, a reference signal over the beam as part of the coordinated beam training with one or more additional transmission-reception points. The operations of 1720 may be performed according to the methods described herein. In some examples, aspects of the operations of 1720 may be performed by a beam training component as described with reference to FIGS. 9 through 12.

At 1725, the TRxP may transmit, to the UE, a beamformed transmission over the beam, the beamformed transmission coordinated with at least one beamformed transmission of the one or more additional transmission-reception points. The operations of 1725 may be performed according to the methods described herein. In some examples, aspects of the operations of 1725 may be performed by a CoMP component as described with reference to FIGS. 9 through 12.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure. The following examples or aspects may be combined with other aspects, embodiments, or examples discussed herein.

Example 1 is a method for wireless communication at a UE that includes transmitting, to a plurality of transmission-reception points, an indication of a number of supported antennas at the UE for signal reception, transmitting a request for a coordinated beam training by the plurality of transmission-reception points over a set of resources, the set of resources based at least in part on the number of supported antennas at the UE, determining, based at least in part on the coordinated beam training, a set of beam weights for coordinated reception at the supported antennas of the UE, and receiving, based at least in part on the determining, a coordinated beamformed transmission from the plurality of transmission-reception points.

In Example 2, the method of Example 1 further includes determining, for a transmission-reception point of the plurality of transmission-reception points, a plurality of co-phasing factors within an antenna panel.

In Example 3, the method of any of Examples 1-2 further includes that the plurality of co-phasing factors within the antenna panel are associated with distinct clusters of a channel, the channel supporting communication between the transmission-reception point and the UE.

In Example 4, the method of any of Examples 1-3 further includes receiving beam swept synchronization signals from the transmission-reception point, selecting, based at least in part on the receiving, a first set of beams for non-coordinated transmissions by the transmission-reception point and a second set of beams for reception at the UE, and determining a signal strength for a plurality of beam pairs, each beam pair of the plurality of beam pairs comprising a beam of the first set of beams and a beam of the second set of beams.

In Example 5, the method of any of Examples 1-4 further includes correlating symbol estimates for each beam pair of the plurality of beam pairs, and where determining the plurality of co-phasing factors within the antenna panel is based at least in part on the correlating.

In Example 6, the method of any of Examples 1-5 further includes transmitting, to the transmission-reception point, an indication of the first set of beams, the signal strength for the plurality of beam pairs, and the plurality of co-phasing factors within the antenna panel.

In Example 7, the method of any of Examples 1-6 further includes receiving a reference signal transmission from each transmission-reception point of the plurality of transmission-reception points as part of the coordinated beam training, the reference signal transmission from each transmission-reception point sharing a common modulation symbol.

In Example 8, the method of any of Examples 1-7 further includes estimating an effective channel for the number of supported antennas at the UE, and where determining the beam weights for coordinated reception at the UE is based at least in part on the estimating.

In Example 9, the method of any of Examples 1-8 further includes determining, as part of a per-antenna sampling, a received signal estimate for an antenna of the number of supported antennas at the UE with a distinct time-sample of the set of resources.

In Example 10, the method of any of Examples 1-9 further includes determining, as part of a unitary matrix sampling, a received signal estimate for the number of supported antennas at the UE with a distinct time-sample of the set of resources.

In Example 11, the method of any of Examples 1-10 further includes selecting a subarray of antennas from a set of supported subarrays of antennas at the UE, and where the coordinated beam training is based at least in part on the selecting.

In Example 12, the method of any of Examples 1-11 further includes determining a set of beam weights at the UE based at least in part on the coordinated beam training, and where determining the beam for coordinated reception is based at least in part on determining the set of beam weights.

In Example 13, the method of any of Examples 1-12 further includes simultaneously receiving the same information bits from each transmission-reception point of the plurality of transmission-reception points.

In Example 14, the method of any of Examples 1-13 further includes that the set of resources comprises contiguous channel state information reference signal resources.

In Example 15, the method of any of Examples 1-14 further includes that the coordinated beamformed transmission is part of a coordinated multipoint transmission by the plurality of transmission-reception points.

Example 16 is a method for wireless communication at a transmission-reception point that includes receiving an indication of a number of supported antennas at a UE for signal reception, determining a beam for a coordinated beam training over a set of resources, the set of resources based at least in part on the number of supported antennas at the UE, transmitting, to the UE, a reference signal over the beam as part of the coordinated beam training with one or more additional transmission-reception points, and transmitting, to the UE, a beamformed transmission over the beam, the beamformed transmission coordinated with at least one beamformed transmission of the one or more additional transmission-reception points.

In Example 17, the method of Example 16 further includes receiving, from the UE, an indication comprising a plurality of co-phasing factors within an antenna panel at the transmission-reception point.

In Example 18, the method of any of Examples 16-17 further includes determining a set of beam weights at the transmission-reception point based at least in part on the indication, and where determining the beam for the coordinated beam training is based at least in part on determining the set of beam weights.

In Example 19, the method of any of Examples 16-18 further includes transmitting beam swept synchronization signals to the UE, and where receiving the indication is based at least in part on the transmitting.

In Example 20, the method of any of Examples 16-19 further includes that the plurality of co-phasing factors within the antenna panel are associated with distinct clusters of a channel, the channel supporting communication between the transmission-reception point and the UE.

In Example 21, the method of any of Examples 16-20 further includes that the indication further comprises a first set of beams for non-coordinated transmission by the transmission-reception point and a signal strength for a plurality of beam pairs, each beam pair of the plurality of beam pairs comprising a beam of the first set of beams and a beam of a second set of beams for reception at the UE.

In Example 22, the method of any of Examples 16-21 further includes coordinating with the one or more additional transmission-reception points via a backhaul link, and where transmitting the reference signal over the beam as part of the coordinated beam training is based at least in part on the coordinating.

In Example 23, the method of any of Examples 16-22 further includes simultaneously transmitting the same information bits with the at least one beamformed transmission of the one or more additional transmission-reception points.

In Example 24, the method of any of Examples 16-23 further includes receiving a request from the UE for the coordinated beam training, and where determining the beam for the coordinated beam training is based at least in part on the receiving.

In Example 25, the method of any of Examples 16-24 further includes that the reference signal shares a common modulation symbol with at least one reference signal transmission of the one or more additional transmission-reception points.

In Example 26, the method of any of Examples 16-25 further includes that the set of resources comprises contiguous channel state information reference signal resources.

In Example 27, the method of any of Examples 16-26 further includes that the beamformed transmission is part of a coordinated multipoint transmission by the transmission-reception point and the one or more additional transmission-reception points.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) comprising:
performing individual beam training with a transmission-reception point of a plurality of transmission-reception points, wherein performing the individual beam training comprises:
receiving beam swept synchronization signals from the transmission-reception point;
selecting, in response to the receiving, a first set of beams for non-coordinated transmissions by the transmission-reception point and a second set of beams for reception at the UE; and
determining a signal strength for a plurality of beam pairs, each beam pair of the plurality of beam pairs comprising a beam of the first set of beams and a beam of the second set of beams;
transmitting, to the transmission-reception point, an indication of a plurality of co-phasing factors within an antenna panel of the transmission-reception point based at least in part on the individual beam training performed with the transmission-reception point, wherein the plurality of co-phasing factors are based at least in part on a plurality of symbol estimates associated with the individual beam training;
performing a coordinated beam training with the plurality of transmission-reception points based at least in part on the plurality of co-phasing factors;
determining, based at least in part on the coordinated beam training, a set of beam weights for coordinated reception of a coordinated beamformed transmission comprising joint transmissions from the plurality of transmission-reception points to the UE; and
receiving, at the UE and based at least in part on the determining, the coordinated beamformed transmission from the plurality of transmission-reception points.

2. The method of claim 1, further comprising:
transmitting, to the plurality of transmission-reception points, an indication of a number of supported antennas at the UE for signal reception, wherein a set of resources for the coordinated beam training is based at least in part on the number of supported antennas at the UE.

3. The method of claim 1, wherein the plurality of co-phasing factors within the antenna panel are associated with distinct clusters of a channel, the channel supporting communication between the transmission-reception point and the UE.

4. The method of claim 1, further comprising:
correlating symbol estimates for each beam pair of the plurality of beam pairs, wherein determining the plurality of co-phasing factors within the antenna panel is based at least in part on the correlating.

5. The method of claim 1, further comprising:
transmitting, to the transmission-reception point, an indication of the first set of beams, the signal strength for the plurality of beam pairs, and the plurality of co-phasing factors within the antenna panel.

6. The method of claim 1, further comprising:
receiving a reference signal transmission from each transmission-reception point of the plurality of transmission-reception points as part of the coordinated beam training, the reference signal transmission from each transmission-reception point sharing a common modulation symbol.

7. The method of claim 2, further comprising:
estimating an effective channel for the number of supported antennas at the UE, wherein determining the set of beam weights for coordinated reception at the UE is based at least in part on the estimating.

8. The method of claim 7, wherein estimating the effective channel further comprises:
determining, as part of a per-antenna sampling, a received signal estimate for an antenna of the number of supported antennas at the UE with a distinct time-sample of the set of resources.

9. The method of claim 7, wherein estimating the effective channel further comprises:
determining, as part of a unitary matrix sampling, a received signal estimate for the number of supported antennas at the UE with a distinct time-sample of the set of resources.

10. The method of claim 1, further comprising:
selecting a subarray of antennas from a set of supported subarrays of antennas at the UE, wherein the coordinated beam training is based at least in part on the selecting.

11. The method of claim 1, wherein determining a coordinated beam for the coordinated reception is based at least in part on determining the set of beam weights.

12. The method of claim 1, wherein receiving the coordinated beamformed transmission further comprises:
simultaneously receiving the same information bits from each transmission-reception point of the plurality of transmission-reception points.

13. The method of claim 2, wherein the set of resources comprises contiguous channel state information reference signal resources.

14. The method of claim 1, wherein the coordinated beamformed transmission is part of a coordinated multipoint transmission by the plurality of transmission-reception points.

15. A method for wireless communication at a transmission-reception point, comprising:
performing individual beam training with a user equipment (UE), wherein performing the individual beam training comprises:
transmitting beam swept synchronization signals to the UE; and
receiving, from the UE, a first set of beams for non-coordinated transmission by the transmission-reception point and a signal strength for a plurality of beam pairs, each beam pair of the plurality of beam pairs comprising a beam of the first set of beams and a beam of a second set of beams for reception at the UE;
receiving, from the UE, an indication of a plurality of co-phasing factors within an antenna panel of the transmission-reception point based at least in part on the individual beam training performed with the UE, wherein the plurality of co-phasing factors are based at least in part on a plurality of symbol estimates associated with the individual beam training;
determining a coordinated beam for a coordinated beam training based at least in part on the plurality of co-phasing factors;
transmitting, to the UE, a reference signal over the coordinated beam as part of the coordinated beam training with one or more additional transmission-reception points; and
transmitting, to the UE, a beamformed transmission over the coordinated beam, the beamformed transmission coordinated with at least one joint beamformed transmission to the UE from the one or more additional transmission-reception points.

16. The method of claim 15, further comprising:
receiving, from the UE, an indication of a number of supported antennas at the UE, wherein a set of resources for the coordinated beam training is based at least in part on the number of supported antennas at the UE.

17. The method of claim 15, further comprising:
determining a set of beam weights at the transmission-reception point based at least in part on the indication of the plurality of co-phasing factors, wherein determining the coordinated beam for the coordinated beam training is based at least in part on determining the set of beam weights.

18. The method of claim 15, wherein the plurality of co-phasing factors within the antenna panel are associated with distinct clusters of a channel, the channel supporting communication between the transmission-reception point and the UE.

19. The method of claim 15, further comprising:
coordinating with the one or more additional transmission-reception points via a backhaul link, wherein transmitting the reference signal over the coordinated beam as part of the coordinated beam training is based at least in part on the coordinating.

20. The method of claim 15, wherein transmitting the beamformed transmission further comprises:
simultaneously transmitting the same information bits with the at least one joint beamformed transmission of the one or more additional transmission-reception points.

21. The method of claim 15, further comprising:
receiving a request from the UE for the coordinated beam training, wherein determining the coordinated beam for the coordinated beam training is based at least in part on the receiving.

22. The method of claim 15, wherein the reference signal shares a common modulation symbol with at least one reference signal transmission of the one or more additional transmission-reception points.

23. The method of claim 16, wherein the set of resources comprises contiguous channel state information reference signal resources.

24. The method of claim 15, wherein the beamformed transmission is part of a coordinated multipoint transmission by the transmission-reception point and the one or more additional transmission-reception points.

25. An apparatus for wireless communication at a user equipment (UE), comprising:
a processor;
memory in electronic communication with the processor; and
instructions stored in the memory and executable by the processor to cause the apparatus to:
perform individual beam training with a transmission-reception point of a plurality of transmission-reception points, wherein, to perform the individual beam training, the instructions are executable by the processor to cause the apparatus to:
receive beam swept synchronization signals from the transmission-reception point;
select, in response to the receiving, a first set of beams for non-coordinated transmissions by the transmission-reception point and a second set of beams for reception at the UE; and determine a signal strength for a plurality of beam pairs, each beam pair of the plurality of beam pairs comprising a beam of the first set of beams and a beam of the second set of beams;
transmit, to the transmission-reception point, an indication of a plurality of co-phasing factors within a first antenna panel of the transmission-reception point based at least in part on the individual beam training performed with the transmission-reception point, wherein the plurality of co-phasing factors are based at least in part on a plurality of symbol estimates associated with the individual beam training;
perform a coordinated beam training with the plurality of transmission-reception points based at least in part on the plurality of co-phasing factors;
determine, based at least in part on the coordinated beam training, a set of beam weights for coordinated reception of a coordinated beamformed transmission comprising joint transmissions from the plurality of transmission-reception points to the UE; and
receive, at the UE and based at least in part on the determining, the coordinated beamformed transmission from the plurality of transmission-reception points.

26. The apparatus of claim 25, wherein the instructions are further executable by the processor to cause the apparatus to:
transmit, to the plurality of transmission-reception points, an indication of a number of supported antennas at the UE for signal reception, wherein a set of resources for the coordinated beam training is based at least in part on the number of supported antennas at the UE.

27. An apparatus for wireless communication at a transmission-reception point, comprising:
a processor;
memory in electronic communication with the processor; and
instructions stored in the memory and executable by the processor to cause the apparatus to:
perform individual beam training with a user equipment (UE), wherein, to perform the individual beam training, the instructions are executable by the processor to cause the apparatus to:
transmit beam swept synchronization signals to the UE; and
receive, from the UE, a first set of beams for non-coordinated transmission by the transmission-reception point and a signal strength for a plurality of beam pairs, each beam pair of the plurality of beam pairs comprising a beam of the first set of beams and a beam of a second set of beams for reception at the UE;
receive, from the UE, an indication of a plurality of co-phasing factors within an antenna panel of the transmission-reception point based at least in part on the individual beam training performed with the UE, wherein the plurality of co-phasing factors are based at least in part on a plurality of symbol estimates associated with the individual beam training;
determine a beam for a coordinated beam training based at least in part on the plurality of co-phasing factors;
transmit, to the UE, a reference signal over the beam as part of the coordinated beam training with one or more additional transmission-reception points; and transmit, to the UE, a beamformed transmission over the beam, the beamformed transmission coordinated with at least one joint beamformed transmission to the UE from the one or more additional transmission-reception points.

* * * * *